(12) United States Patent
Eun et al.

(10) Patent No.: US 12,425,221 B2
(45) Date of Patent: Sep. 23, 2025

(54) AUTHENTICATION METHOD AND AUTHENTICATION SYSTEM USING BIOMETRIC INFORMATION AND FUNCTIONAL ENCRYPTION

(71) Applicant: SAMSUNG ELECTRONICS CO., LTD., Suwon-si (KR)

(72) Inventors: Heeseok Eun, Suwon-si (KR); Wijik Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 303 days.

(21) Appl. No.: 17/984,052

(22) Filed: Nov. 9, 2022

(65) Prior Publication Data
US 2023/0145500 A1    May 11, 2023

(30) Foreign Application Priority Data

Nov. 9, 2021 (KR) .................. 10-2021-0152785
Mar. 28, 2022 (KR) .................. 10-2022-0038173

(51) Int. Cl.
*H04L 9/32* (2006.01)
*H04L 9/14* (2006.01)

(52) U.S. Cl.
CPC .............. *H04L 9/3231* (2013.01); *H04L 9/14* (2013.01)

(58) Field of Classification Search
CPC ................................ H04L 9/3231; H04L 9/14
(Continued)

(56) References Cited

U.S. PATENT DOCUMENTS

| | | | |
|---|---|---|---|
| 10,649,919 B2 | 5/2020 | Unagami et al. | |
| 11,012,424 B2 | 5/2021 | Choi et al. | |

(Continued)

FOREIGN PATENT DOCUMENTS

| | | |
|---|---|---|
| KR | 1838432 B1 | 3/2018 |
| KR | 1947871 A | 4/2018 |

(Continued)

*Primary Examiner* — Jacob Lipman
(74) *Attorney, Agent, or Firm* — Fish & Richardson P.C.

(57) ABSTRACT

An authentication method including, at an apparatus— generating a master secret key and a master public key, generating a secret key and a public key using enrollment target personal information, the master secret key and the master public key, and generating first information using the enrollment target personal information. Communicating the secret key and the first information from the apparatus to the authentication server, storing the secret key and the first information in a secure area of the authentication server, generating at the apparatus, a ciphertext encrypted using authentication target personal information and the public key, second information using the authentication target personal information and communicating the ciphertext and the second information from the apparatus to the authentication server. At the authentication server, performing an authentication of the authentication target personal information using the secret key, the first information, the ciphertext and the second information, wherein the performing of the authentication of the authentication target personal information includes calculating a similarity between the enrollment target personal information and the authentication target personal information by computing an Euclidean distance of the enrollment target personal information and the authentication target personal information, and the performing of the authentication of the authentication target personal information is performed in relation to the similarity.

20 Claims, 40 Drawing Sheets

(58) Field of Classification Search
USPC .......................................................... 713/186
See application file for complete search history.

(56) References Cited

U.S. PATENT DOCUMENTS

| | | | |
|---|---|---|---|
| 11,023,569 | B2 | 6/2021 | Eldefrawy et al. |
| 2013/0114810 | A1* | 5/2013 | Kobayashi ................ H04L 9/14 380/47 |
| 2019/0182221 | A1* | 6/2019 | Choi ........................ H04L 63/06 |
| 2019/0349362 | A1* | 11/2019 | Cheon .................. H04L 63/0861 |
| 2021/0240840 | A1 | 8/2021 | Goldsteen et al. |
| 2021/0306147 | A1* | 9/2021 | Aharoni ................... G06F 21/32 |
| 2021/0336792 | A1* | 10/2021 | Agrawal .................... H04L 9/30 |

FOREIGN PATENT DOCUMENTS

| | | | |
|---|---|---|---|
| KR | 1994236 | A | 10/2018 |
| KR | 2008101 | B1 | 7/2019 |

* cited by examiner

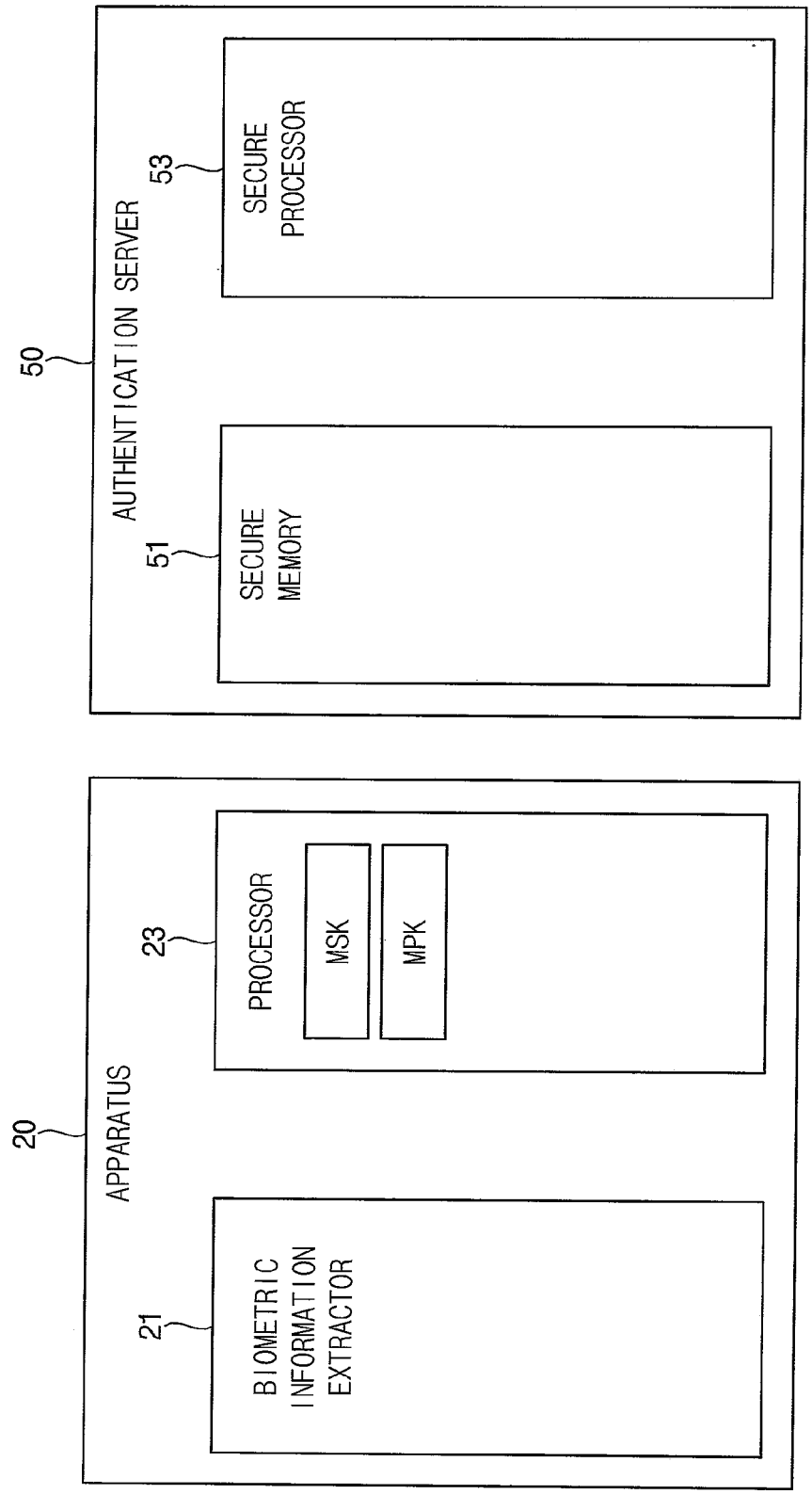

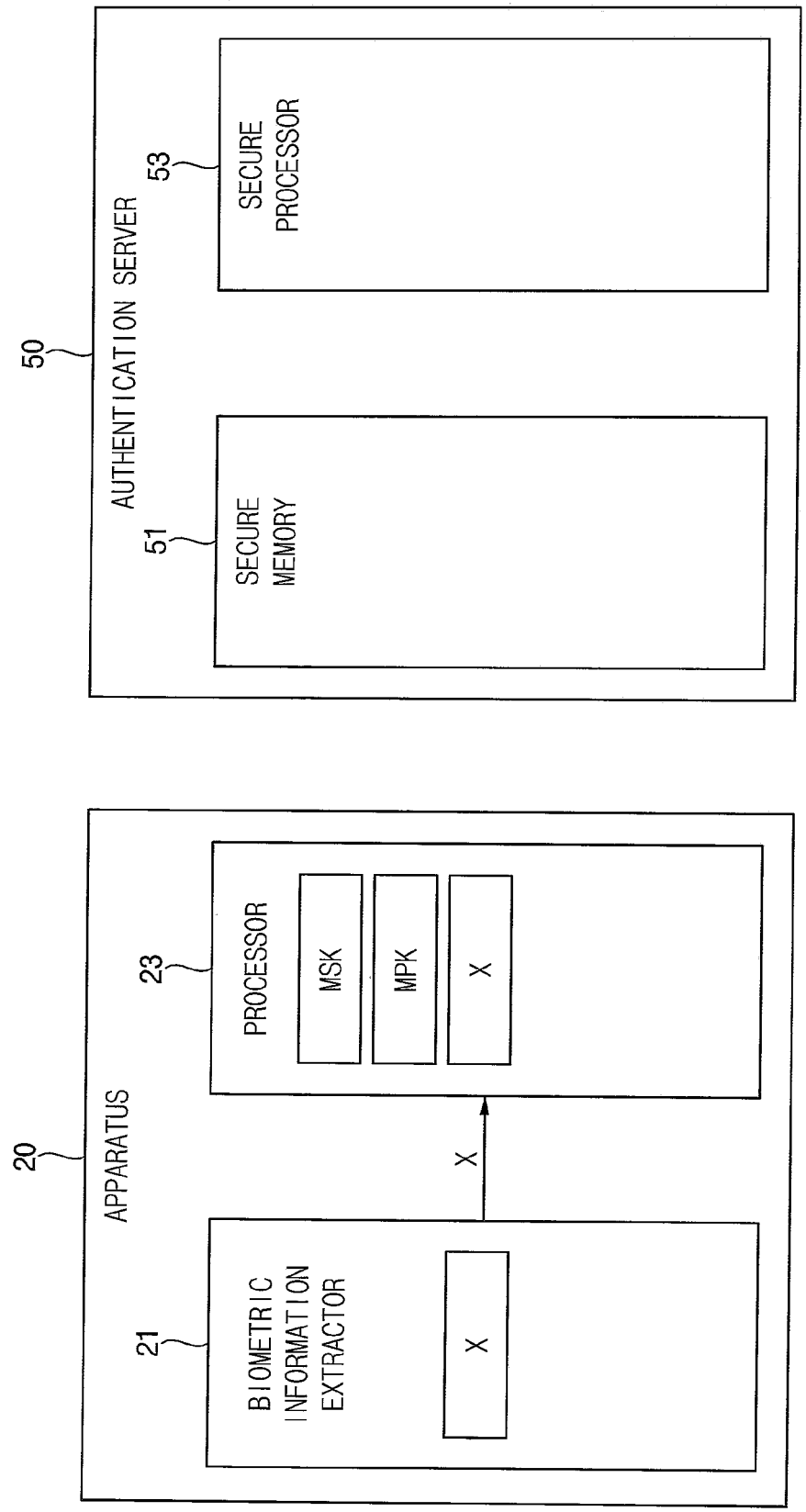

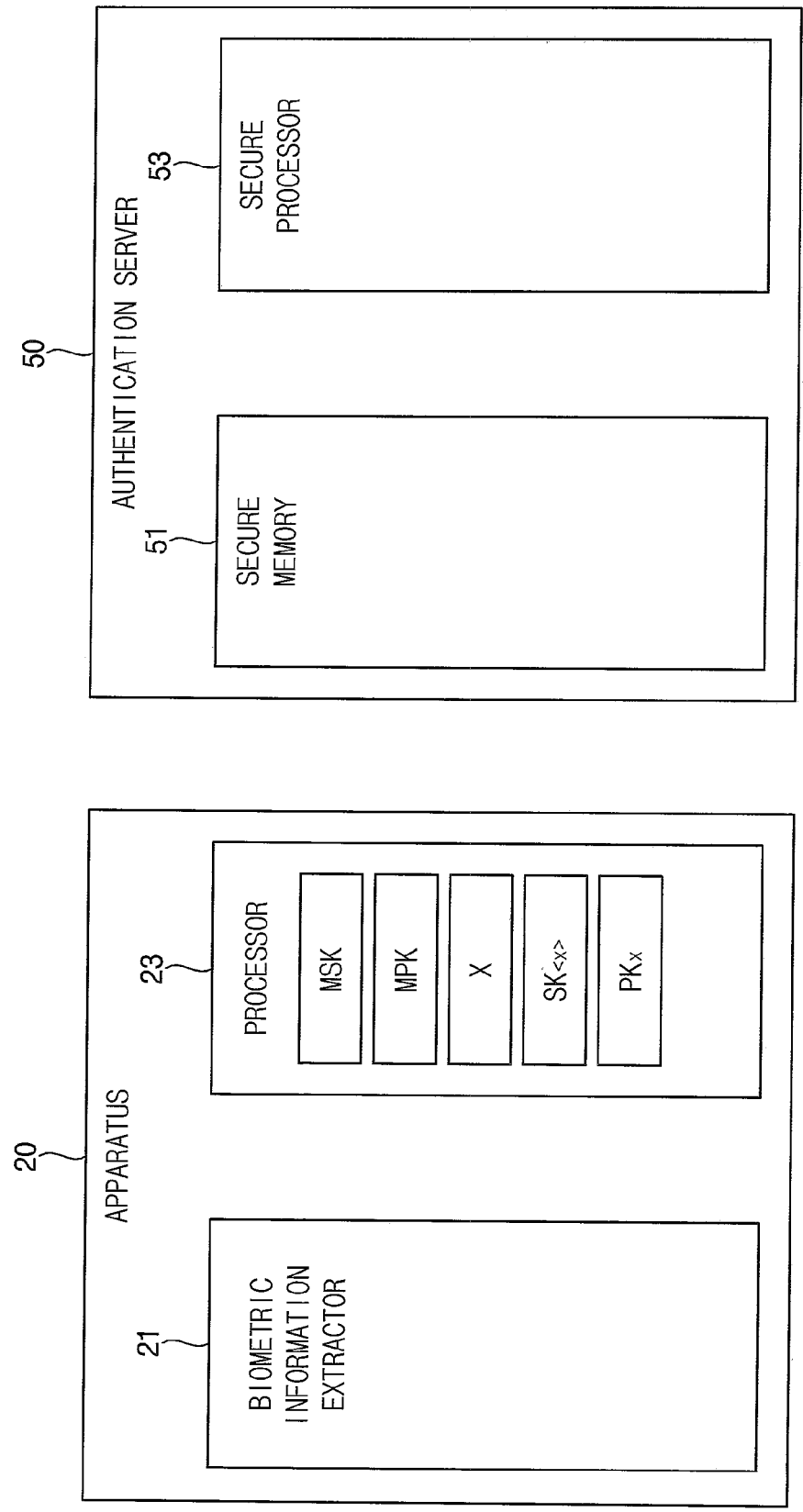

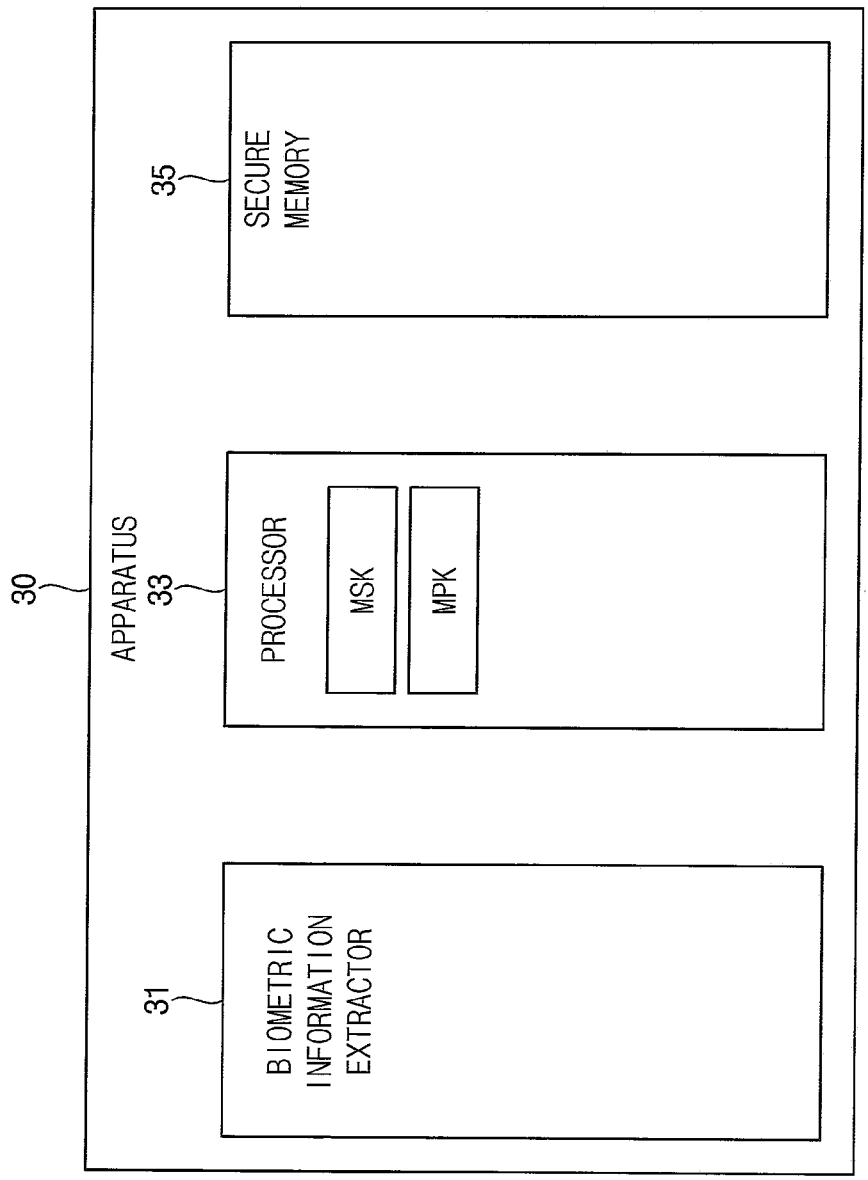

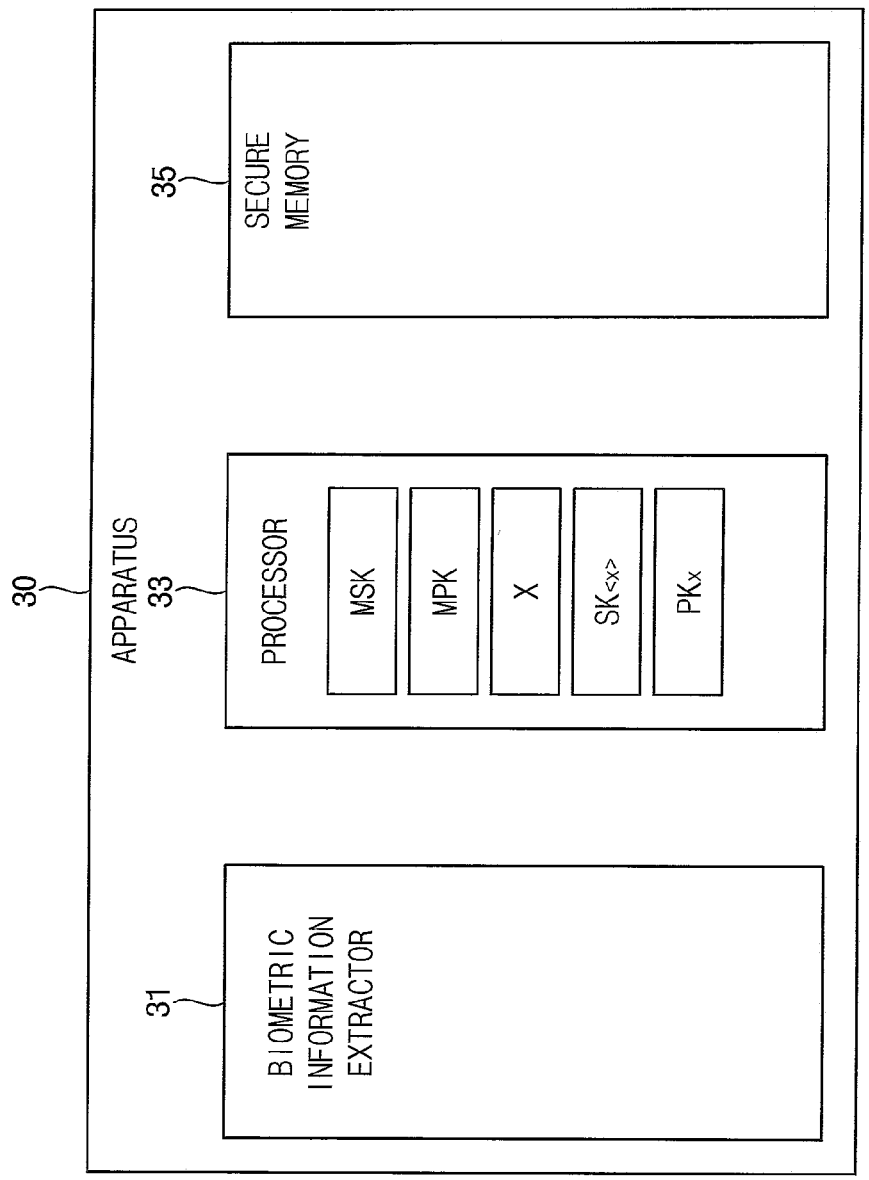

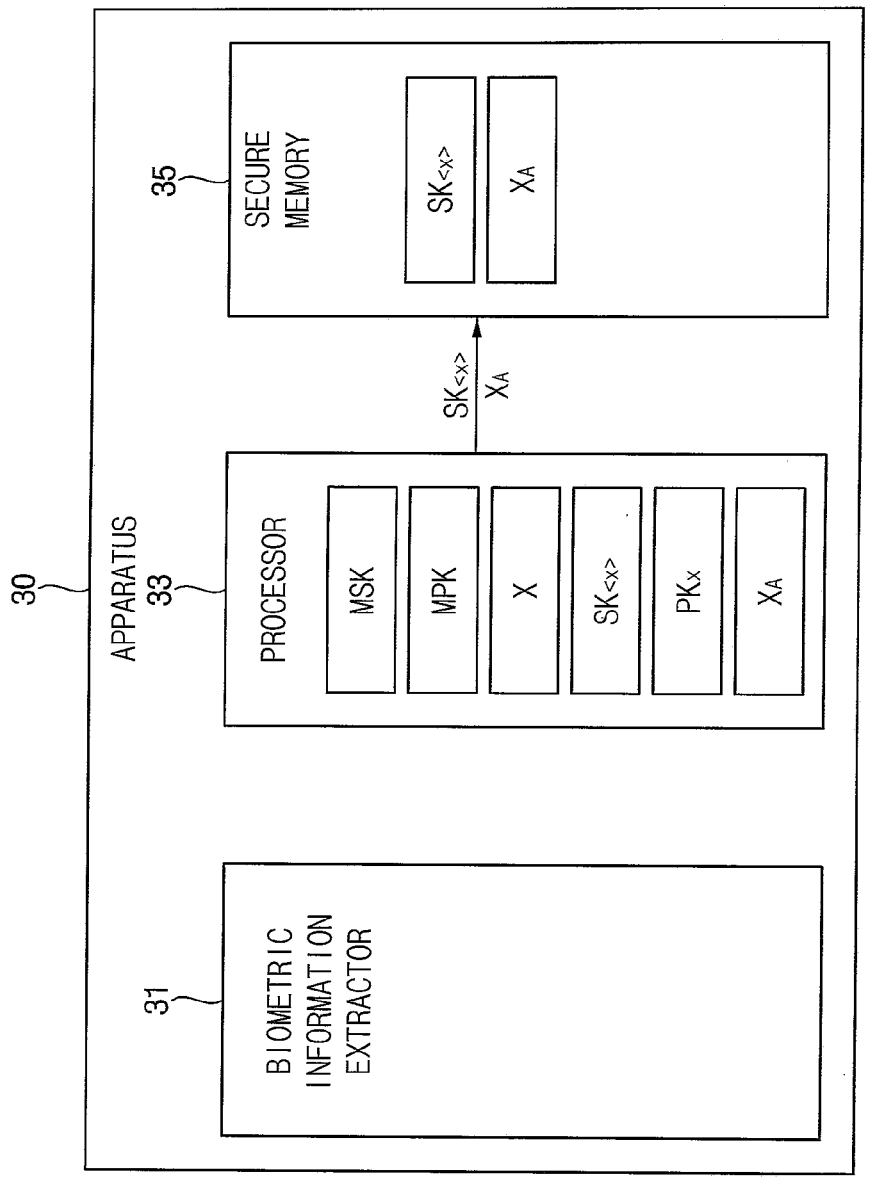

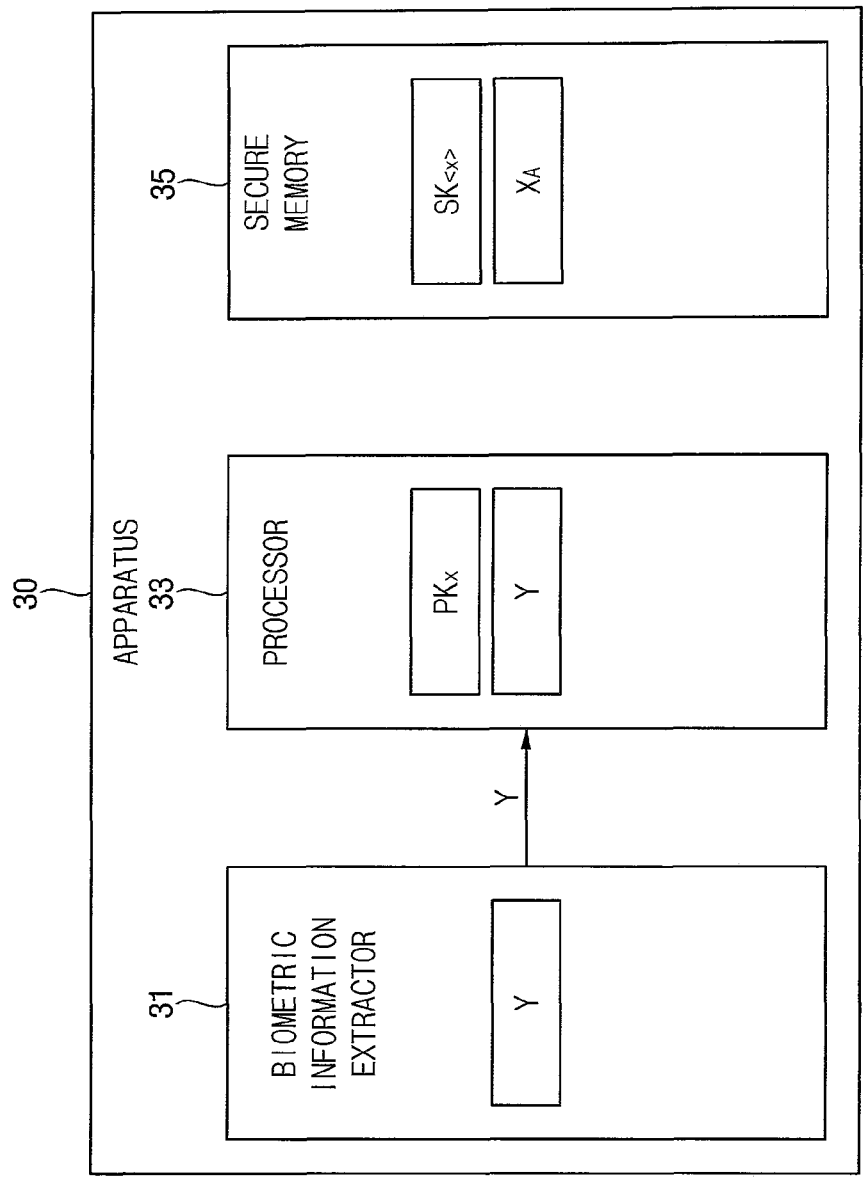

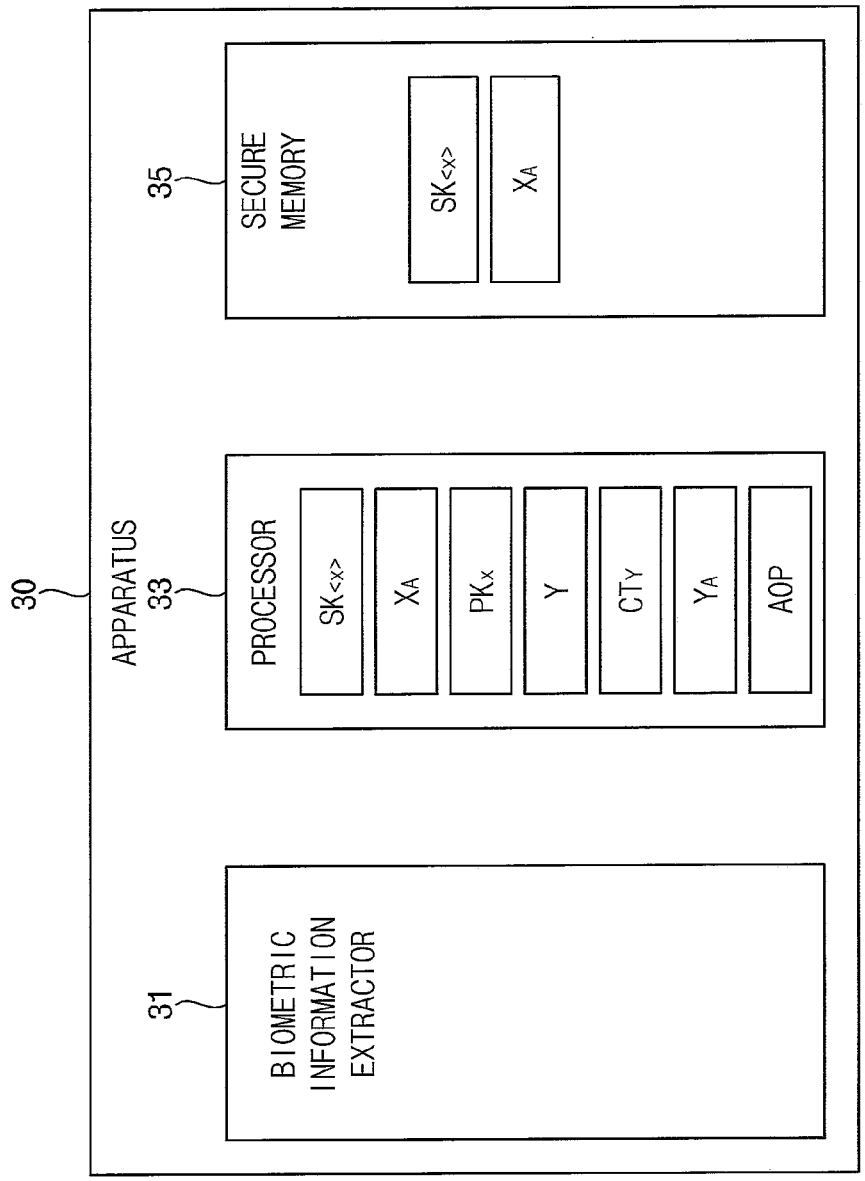

AUTHENTICATION METHOD AND AUTHENTICATION SYSTEM USING BIOMETRIC INFORMATION AND FUNCTIONAL ENCRYPTION

CROSS-REFERENCE TO RELATED APPLICATION

This application claims priority under 35 USC § 119 to Korean Patent Application No. 10-2021-0152785 filed on Nov. 9, 2021 and Korean Patent Application No. 10-2022-0038173 filed on Mar. 28, 2022, the collective subject matter of which is hereby incorporated by reference in its entirety.

BACKGROUND

1. Technical Field

The inventive concept relates generally to personal authentication technology, and more particularly, to authentication methods and authentication systems using biometric information and functional encryption.

2. Description of the Related Art

With the development of biometric recognition technology, biometric information authentication technologies using unique biometric information from an individual (e.g., an iris scan, a fingerprint reading, deoxyribo nucleic acid (DNA) detection, a retina scan, a vein scan, gait detection, face recognition, voice matching, and the like) as part of personal authentication have been studied. However, biometric information cannot be voluntarily changed by the individual, so any material leaking of biometric information may directly result in a serious privacy violation. Therefore, an approach preventing leakage of biometric information during authentication is essential for successful use of an authentication method predicated upon biometric information.

Recently, researchers have developed various schemes for a general-use biometric authentication that enable authentication without risk of leaking (or exposing) biometric information even in a system wherein personal authentication is required for unspecified individuals, as well as in a device possessed by an individual.

SUMMARY

Embodiments of the inventive concept provide authentication methods using biometric information and functional encryption capable of efficiently performing personal authentication without leaking of biometric information. And other embodiments of the inventive concept provide authentication systems capable of performing such authentication methods.

According to some embodiments of the inventive concept, in an authentication method using a functional encryption in an authentication system including an apparatus and an authentication server, at the apparatus, a master secret key and a master public key are generated. At the apparatus, a secret key and a public key are generated using enrollment target personal information, the master secret key and the master public key. At the apparatus, first information is generated using the enrollment target personal information. At the apparatus, the secret key and the first information are communicated to the authentication server. The secret key and the first information are stored in a secure area of the authentication server. At the apparatus, a ciphertext encrypted using authentication target personal information and the public key is generated. At the apparatus, second information is generated using the authentication target personal information. At the apparatus, the ciphertext and the second information are communicated to the authentication server. At the authentication server, an authentication for the authentication target personal information is performed using the secret key, the first information, the ciphertext and the second information. When performing authentication, a similarity between the enrollment target personal information and the authentication target personal information is calculated by computing an Euclidean distance of the enrollment target personal information and the authentication target personal information. The authentication is performed in relation to (or based on) the similarity.

According to some embodiments of the inventive concept, in an authentication method using a functional encryption in an apparatus, a master secret key and a master public key are generated. A secret key and a public key are generated using enrollment target personal information, the master secret key and the master public key. First information is generated using the enrollment target personal information. The secret key and the first information are stored in a secure area of the apparatus. A ciphertext encrypted using authentication target personal information and the public key is generated. Second information is generated using the authentication target personal information. An authentication for the authentication target personal information is performed using the secret key, the first information, the ciphertext and the second information. When performing authentication, a similarity between the enrollment target personal information and the authentication target personal information is calculated by computing an Euclidean distance of the enrollment target personal information and the authentication target personal information. The authentication is performed in relation to the similarity.

According to some embodiments of the inventive concept, an authentication system includes an apparatus and an authentication server. Here, the authentication server communicates with the apparatus, performs an authentication using a functional encryption, and includes a secure area. The apparatus generates a master secret key and a master public key, generates a secret key and a public key using enrollment target personal information, the master secret key and the master public key, generates first information using the enrollment target personal information, communicates the secret key and the first information to the authentication server, generates a ciphertext encrypted using authentication target personal information and the public key, generates second information using the authentication target personal information, and communicates the ciphertext and the second information to the authentication server. The authentication server stores the secret key and the first information in the secure area, calculates a similarity between the enrollment target personal information and the authentication target personal information by computing an Euclidean distance of the enrollment target personal information and the authentication target personal information using the secret key, the first information, the ciphertext and the second information, without exposing the enrollment target personal information and the authentication target personal information, and performs the authentication in relation to the similarity. The apparatus physically erases memory storing the secret key and the first information after communicating the secret key and the first information to the authentication server, and physically erases memory storing the ciphertext and the second information after communicating the ciphertext and the second information to the authentication server. The authentication server physically erases memory storing the ciphertext and the second information after performing the authentication.

In the authentication method and the authentication system according to embodiments of the inventive concept, authentication may be performed using functional encryption. In a public key encryption, plaintext may be encrypted using a public key to obtain a ciphertext, and the ciphertext may be decrypted using a secret key to obtain the plaintext. In contrast, in the functional encryption, plaintext may be encrypted using a public key to obtain a ciphertext, only a function value may be obtained using a secret key associated with or related to a function without decrypting the ciphertext into plaintext, and an authentication may be performed using the function value. That is, authentication may be performed without decrypting the encrypted biometric information. Accordingly, the personal authentication may be efficiently performed without exposing the personal information.

In addition, in authentication methods and authentication systems according to embodiments of the inventive concept, a similarity measurement may be performed by computing the Euclidean distance during the authentication process, and the Euclidean distance may be computed without directly using the biometric information. Further, among information generated during the authentication process, some information that does not need to be stored may be deleted and/or erased. Accordingly, personal authentication may be safely and efficiently performed.

BRIEF DESCRIPTION OF THE DRAWINGS

Advantages, benefits, and features, as well as the making and use of the inventive concept may be more clearly understood upon consideration of the following detailed description together with the accompanying drawings, in which:

FIGS. 23A, 23B, 23C, 23D and 23E are related block diagrams further illustrating the method of FIG. 22;

FIGS. 26A, 26B, 26C, 26D and 26E are related block diagrams further illustrating the method of FIG. 25.

DETAILED DESCRIPTION

Various example embodiments of the inventive concept will be described more fully with reference to the accompanying drawings. The present disclosure may, however, be embodied in many different forms and should not be construed as being limited to only the illustrated embodiments set forth herein. Throughout the written description and drawings, like reference number and labels are used to denote like or similar elements, components, features and/or method steps.

Figure 1:
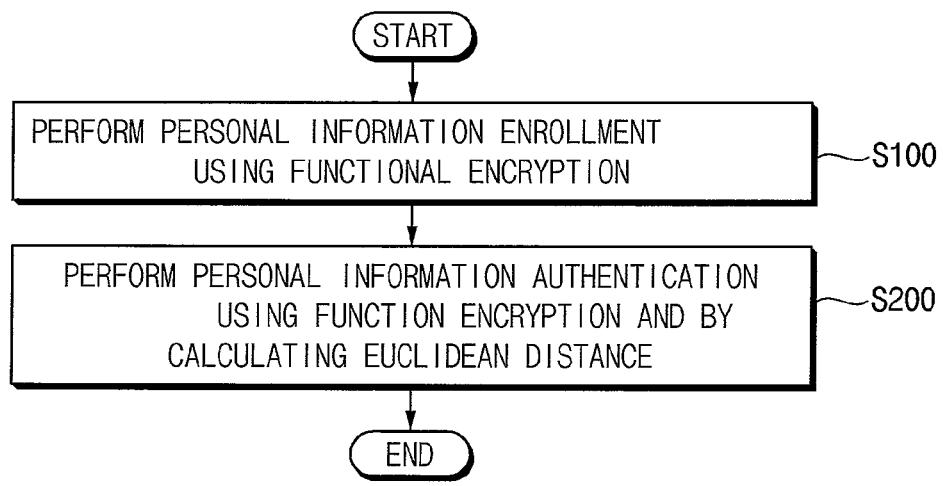
FIG. 1 is a general flowchart illustrating an authentication method according to embodiments of the inventive concept.

Figure (FIG. 1 is a general flowchart illustrating an authentication method according to embodiments of the inventive concept.

Referring to FIG. 1, the authentication method may be performed by various authentication systems. For example, certain authentication systems may include an apparatus (or device) and an authentication server. Other authentication systems may include only an apparatus. Exemplary configurations of authentication systems will be described hereafter in some additional detail with reference to at least FIGS. 2, 3, 4 and 21.

The authentication method of FIG. 1 includes; performing personal information enrollment (or registration) using functional encryption (S100), and performing personal information authentication using function encryption and calculation of an Euclidean distance (S200). In some embodiments wherein the authentication system includes an apparatus and am authentication server, the step of personal information enrollment and the step of personal information authentication may be performed at (e.g., "using" or "performed on") both the apparatus and the authentication server. In other embodiment wherein the authentication system includes only the apparatus, the step of personal information enrollment and the step of personal information authentication may be performed using the apparatus.

Here, in some embodiments, the "personal information" (e.g., enrollment target personal information and authentication target personal information) used in relation to the personal information enrollment process and the personal information authentication process may be biometric information unique to an individual. For example biometric information related to at least one of an iris, a fingerprint, deoxyribo nucleic acid (DNA), retina, veins, gait, face, voice, etc. may be used as personal information. However, the scope of the inventive concept is not limited to only the foregoing and various personal information may include any form of information that may be used in accurately verify the identification of the individual.

Thus, authentication technology using biometric information may undertake the identification of individuals by (1) extracting physical and/or behavioral characteristics from the individuals (hereafter generically "biometric information"), and (2) performing personal authentication using precise identification methodologies capable of uniquely and correctly correlating the extracted biometric information with a corresponding individual.

With regard to authentication technology using biometric information, it is very important to safeguard the biometric information. At a minimum, biometric information should be encrypted and stored in a storage space having a high level of security on a device under the individual's personal control. Further in this regard, should biometric information be stored in an external server, the possibility of leaking the biometric information increases, and thereafter, it may be difficult to utilize external devices and/or systems requiring the authentication. In addition, original biometric information may required checking during a verification process. However, such verification processes often increase the possibility of leaking the biometric information, particularly when such verification processes decrypt the biometric information.

In contrast, in relation to authentication methods according to embodiments of the inventive concept, authentication may be performed using functional encryption. In a public key encryption (or cryptography), plaintext may be encrypted using a public key to obtain a ciphertext, and the ciphertext may be decrypted using a secret (or private) key to obtain the plaintext. In contrast, in functional encryption, plaintext may be encrypted using a public key to obtain a ciphertext, only a function value may be obtained using a secret key associated with or related to a function without decrypting the ciphertext into plaintext, and authentication may be performed using the function value. That is, authentication may be performed without decrypting the encrypted biometric information. Accordingly, personal authentication may be efficiently performed without exposing the personal information.

In addition, in authentication methods according to embodiments of the inventive concept, a similarity measurement may be performed by computation of a Euclidean distance during the authentication process, wherein the Euclidean distance may be computed without directly using the biometric information. Further, among information generated during the authentication process, some information that does not need to be stored may be deleted and/or erased. Accordingly, the personal authentication may be further an deficiently safeguarded.

Figure 2:
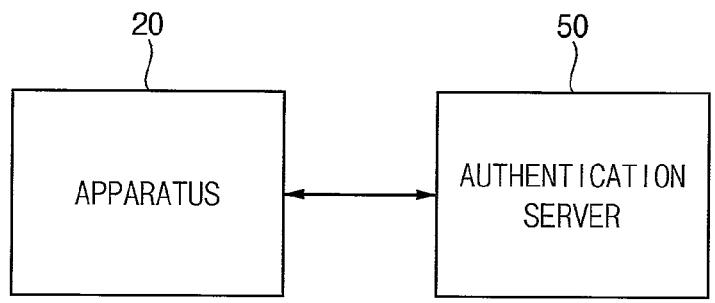
FIG. 2 is a general block diagram illustrating an authentication system according to embodiments of the inventive concept.

FIG. 2 is a general block diagram illustrating an authentication system 10 according to embodiments of the inventive concept.

Referring to FIG. 2, the authentication system 10 includes an apparatus 20 and an authentication server 50.

The apparatus 20 may be a personal device controlled by an individual (e.g., a user). The apparatus 20 may receive personal information (e.g., the enrollment target personal information) to be enrolled to perform the personal information enrollment process, and may receive personal information (e.g., the authentication target personal information) to be authenticated to generate information for performing the personal information authentication process.

The authentication server 50 may be physically separated (or spaced apart) from the device 20. The authentication server 50 may store a key generated as a result of performing the personal information enrollment process, may receive information corresponding to the authentication target personal information from the apparatus 20, and may perform the personal information authentication process using the received information and the stored key.

Figure 3:
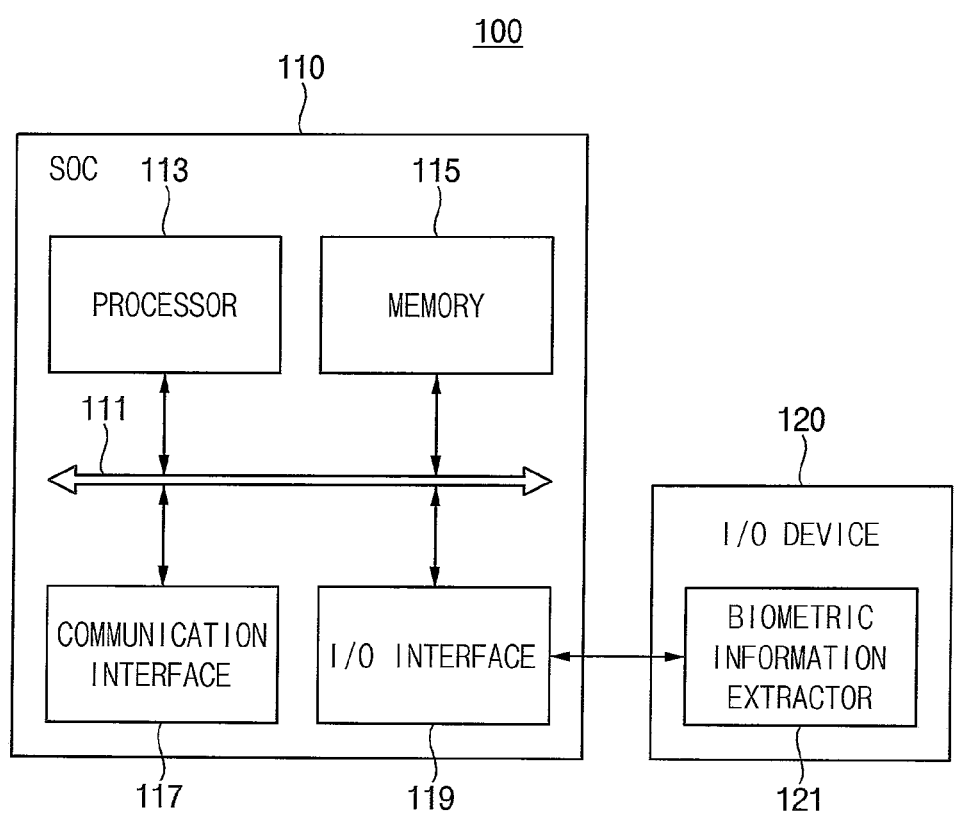
FIGS. 3 and 4 are respective block diagrams illustrating various apparatuses that may be included in the authentication system of FIG. 2.
Figure 4:
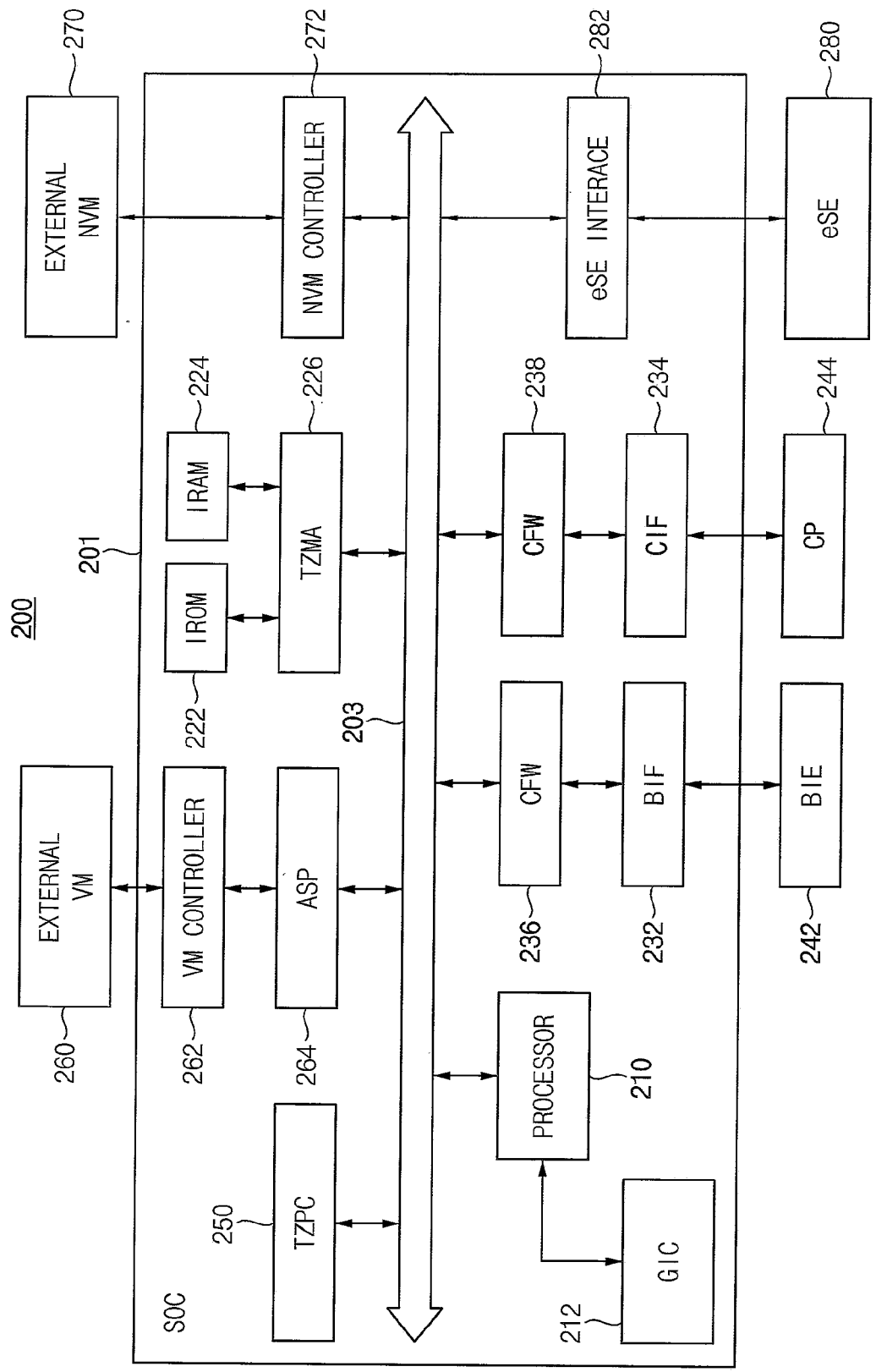

FIGS. 3 and 4 are respective block diagrams illustrating various apparatuses that may be included in the authentication system 50 of FIG. 2.

Referring to FIG. 3, an apparatus 100 may include a system-on-chip (SoC) 110 and an input/output (I/O) device 120.

In some embodiments, when the apparatus 100 including the SoC 110 is a mobile device, the SoC 110 may be an application processor (AP) included in the apparatus 100, or the like.

The SoC 110 may include a bus 111, a processor 113, a memory 115, a communication interface 117 and an I/O interface 119. For convenience of illustration, some elements of the SoC 110 and the apparatus 100 including the SoC 110 are not shown in FIG. 3, but will instead be described in relation to FIG. 4.

The processor 113 may control overall operation of the SoC 110. For example, when the apparatus 100 is the mobile device, the processor 113 may perform various computational functions such as particular calculations and tasks, may execute an operating system (OS) to drive the mobile device, and may execute various applications for providing an internet browser, a game, a video, a camera, or the like. In some embodiments, the processor 113 may include a central processing unit (CPU), a microprocessor, or the like.

In some embodiments like the one described in relation to FIG. 4, the processor 113 may be driven in response to a secure operating system and a normal operating system (or a non-secure operating system). The SoC 110 and the apparatus 100 may operate in a secure mode (or a trusted execution mode) in relation to the secure operating system, and may operate in a non-secure mode (or a non-trusted execution mode or a normal mode) in relation to the normal operating system.

In some embodiments, the processor 113 may include a single processor core and/or a plurality of processor cores. For example, the processor 113 may be implemented with a multi-core, such as a dual-core, a quad-core, a hexa-core, or the like. In some embodiments, the processor 113 may further include a cache memory located within or external to each of the first and second processors 110 and 120.

The memory 115 may stores data and/or instructions that are processed and/or executed by the processor 113. For example, when the apparatus 100 is the mobile device, the memory 115 may store a boot image for booting the mobile device, a file system for the operating system to drive the mobile device, a device driver for an external device connected to the mobile device, and/or an application executed on the mobile device. For example, the memory 115 may include at least one of a volatile memory and a nonvolatile memory. For example, the memory 115 may include tangible and/or non-transitory computer-readable storage media, such as random access memory (RAM), read only memory (ROM), a permanent mass storage device (e.g., solid state (e.g., NAND flash) device, etc.), and/or any other like data storage mechanism capable of storing and recording data.

The communication interface 117 may variously communicate (e.g., transmit and/or receive) one or more signal with circuitry external to the apparatus 100 (e.g., other components within the authentication server 50). For example, the communication interface 117 may communicate with an external device in accordance with a wireless communication protocol, such as a wireless fidelity (WiFi) communication, a 3G communication, a 4G communication, a long term evolution (LTE) communication, a 5G communication, or the like.

The I/O interface 119 may communicate with the I/O device 120 external to the apparatus 100. For example, the I/O interface 119 may communicate with the I/O device 120 in accordance with a predetermined (or otherwise desirable) communication standard, such as a mobile industry processor interface (MIPI), or the like.

The I/O device 120 may include a biometric information extractor 121. The enrollment target personal information and the authentication target personal information that are required to perform the authentication method according to embodiments of the inventive concept may be input (or applied) through the biometric information extractor 121. For example, the enrollment target personal information and the authentication target personal information may include biometric information of the type described above. Thus, in some embodiments, the biometric information extractor 121 may include various types of input means such as various types of sensors configured to extract and/or receive enrollment target personal information and/or authentication target personal information.

Accordingly, although the I/O device 120 of FIG. 3 is shown as including only the biometric information extractor 121 this is merely a general example of many different I/O devices that be used in relation to embodiments of the inventive concept. For example, the I/O device 120 may further include a variety of input means, such as a keyboard, a keypad, a touch pad, a touch screen, a mouse, a remote controller, or the like, and output means such as a display, a speaker, a printer, or the like.

In some embodiments, the apparatus 100 may be implemented as a mobile phone, a laptop computer or an automotive component, however the inventive concept is not limited thereto. In some embodiments, the apparatus 100 may be implemented as a computing device, such as a personal computer (PC), a server, a data center, a workstation, etc. In still other embodiments, the apparatus 100 may be implemented as a smart phone, a tablet computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

Referring to FIG. 4, an apparatus 200 may include a SoC 201, a biometric information extractor (BIE) 242, a communication processor (CP) 244, a volatile memory (VM) 260, a nonvolatile memory (NVM) 270 and an embedded secure element (eSE) 280. FIG. 4 illustrates an example where the apparatus 200 is implemented as a mobile device.

The SoC 201 may be used to control overall operation of the apparatus 200. The SoC 201 may include a processor 210, an interrupt controller (e.g., a generic interrupt controller (GIC)) 212, a protection controller (e.g., a TrustZone protection controller (TZPC)) 250, a first internal memory (e.g., an internal read-only memory (IROM)) 222, a second internal memory (e.g., an internal random access memory (IRAM)) 224, a memory adapter (e.g., a TrustZone memory adapter (TZMA)) 226, a first interface (e.g., a biometric interface (BIF)) 232, a second interface (e.g., a communication processor (CP) interface (CIF)) 234, a first content firewall (CFW) 236, a second content firewall 238, a first memory controller (e.g., a volatile memory (VM) controller) 262, an address space protector (ASP) 264, a second memory controller (e.g., a nonvolatile memory (NVM) controller) 272, a third interface (e.g., an eSE interface) 282 and a bus 203.

The processor 210 of FIG. 4 may correspond to the processor 113 in FIG. 3. Although the illustrated example of FIG. 4, assumes the use of a single processor 210, in other embodiments the SoC 201 may include two or more processors. The processor 210 may variously interconnected with other components via the bus 203. In some embodiments, the processor 210 may include an ARM processor core, and the bus 203 may include an AMBA (advanced microcontroller bus architecture, and/or ARM main memory bus architecture) bus.

The interrupt controller 212 may be used to set secure properties for interrupt resources in the SoC 201. For example, the interrupt controller 212 may divide interrupts into secure interrupts and normal interrupts. The secure interrupts may be referred to as trusted interrupts and/or fast interrupt requests (FIQ). The normal interrupts may be referred to as non-secure interrupts, non-trusted interrupts and/or interrupt requests (IRQ). In some embodiments, such secure properties of the interrupt resources may only be set in the secure mode. The secure interrupts may be processed in the secure mode, and the normal interrupts may be processed in the non-secure mode.

The protection controller 250 may be used to set secure properties for hardware resources in the SoC 201. In some embodiments, the protection controller 250 may divide various hardware components into first (or secure) hardware components associated with a secure mode of operation and second (or non-secure) hardware components associated with a non-secure mode of operation. Here, secure components of the hardware resources may only be set while operating in the secure mode, and may not be set during operation in the non-secure mode. In some embodiments, the interrupt controller 212 may include a chip select and/or slave select control line. Generally, the secure components may operate in the secure mode, and the non-secure components may operate in the non-secure mode. However, in some embodiments, certain components may include both the secure and non-secure components or elements. In such a case, a component including both secure and non-secure elements may operate in both the secure mode and the non-secure mode.

The first internal memory 222 and the second internal memory 224 of FIG. 4 may correspond to the memory 115 of FIG. 3. Here, the first internal memory 222 may include at least one nonvolatile memory, and the second internal memory 224 may include at least one volatile memory.

The memory adapter 226 may be interoperable with the protection controller 250, and may be used to functionally divide a storage region of the second internal memory 224 into a secure region and a non-secure region. In some embodiments, such functional (or access-related) division of the storage region may be performed in only the secure mode.

The first interface 232 and the second interface 234 of FIG. 4 may respectively correspond to the I/O interface 119 and the communication interface 117 of FIG. 3. For example, the first interface 232 may connect the SoC 201 with the biometric information extractor 242 external to the SoC 201 such that the SoC 201 receives biometric information from the biometric information extractor 242. And the second interface 234 may connect the SoC 201 with the communication processor 244 external to the SoC 201, such that the SoC 201 is able to perform wireless communication using the communication processor 244.

The first content firewall 236 and the second content firewall 238 may be used to further control accesses to various components of the SoC 201, and in particular, may be used to prevent leakage of critical information (e.g., biometric information). For example, the first content firewall 236 may control an accessible address space of the first interface 232, and may control an access from the biometric information extractor 242 when the SoC 201 exchanges data with the biometric information extractor 242. Further, the second content firewall 238 may control an accessible address space of the second interface 234, and may control an access from the communication processor 244 when the SoC 201 exchanges data with the communication processor 244.

The first memory controller 262 may control the volatile memory 260 external to the SoC 201. For example, first memory controller 262 may control access to and/or from the volatile memory 260, and/or may communicate read and/or write operations to the volatile memory 260. The volatile memory 260 may include at least one volatile memory, such as a dynamic random access memory (DRAM), a synchronous DRAM (SDRAM), a static random access memory (SRAM), and the like.

The address space protector 264 may be used to divide a storage region in the volatile memory 260 into a secure region and a non-secure region, and may further be used to control access to the volatile memory 260.

The second memory controller 272 may control the nonvolatile memory 270 external to the SoC 201. For example, the second memory controller 272 may control access to and/or from the nonvolatile memory 270, and/or may communicate read and/or write operations to the nonvolatile memory 270. The nonvolatile memory 270 may include at least one nonvolatile memory, such as an electrically erasable programmable read-only memory (EEPROM), a flash memory, a phase change random access memory (PRAM), a resistance random access memory (RRAM), a magnetic random access memory (MRAM), a ferroelectric random access memory (FRAM), a nano floating gate memory (NFGM), a polymer random access memory (PoRAM), or the like. In some embodiments, the nonvolatile memory 270 may be implemented as an embedded multimedia card (eMMC), a universal flash storage (UFS), or the like.

The third interface 282 may be used to connect the SoC 201 with the embedded secure element 280 external to the SoC 201 such that the SoC 201 exchanges data with the embedded secure element 280. In the secure mode, the SoC 201 may execute various secure applications (e.g., for financial transactions, mobile shopping, or the like) using the embedded secure element 280.

Consistent with the foregoing, the SoC 201 and the apparatus 200 may selectively operate in the secure mode. In some embodiments, operation in the secure mode, as described in relation to FIGS. 3 and 4, may be performed in accordance with executed and implemented in accordance with so-called TrustZone technology, a set of commercially available technical standards promulgated by ARM®.

Although MIPI communication, wireless communication and eSE communication have been described as examples of interfaces supported by the SoC devices of FIGS. 3 and 4, other types of interfaces may be used, so long as they are properly supported by the SoC. Accordingly, in some embodiments, the SoC may include one or more components and/or elements enabling communication in accordance with various protocols, such for example, universal serial bus (USB), Ethernet, near field communication (NFC), radio frequency identification (RFID), global system of mobile communications (GSM), general packet radio service (GPRS), wideband code division multiple access (WCDMA), and high speed packet access (HSxPA).

Of additional note, the authentication server 50 of FIG. 2 may be similarly implemented in relation to the apparatus 100 or 200 of FIGS. 3 and 4. For example, the authentication server 50 may include a processor, a memory, an interface, and/or the like, and may operate in a secure mode in response to a secure operating system or in a non-secure mode in response to a normal operating system.

Figure 5A:
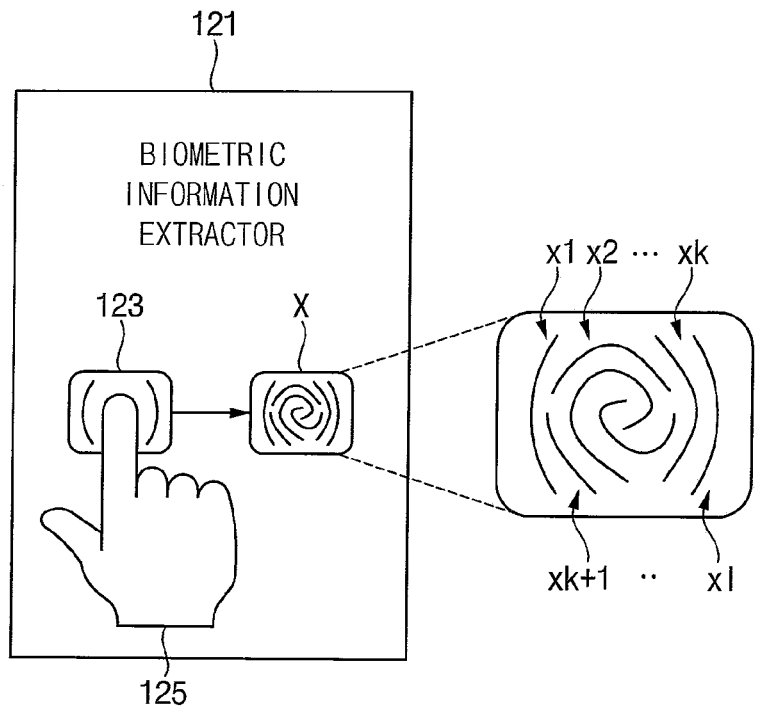
FIGS. 5A and 5B are respective conceptual diagrams illustrating operation of an apparatus included in an authentication system according to embodiments of the inventive concept.
Figure 5B:
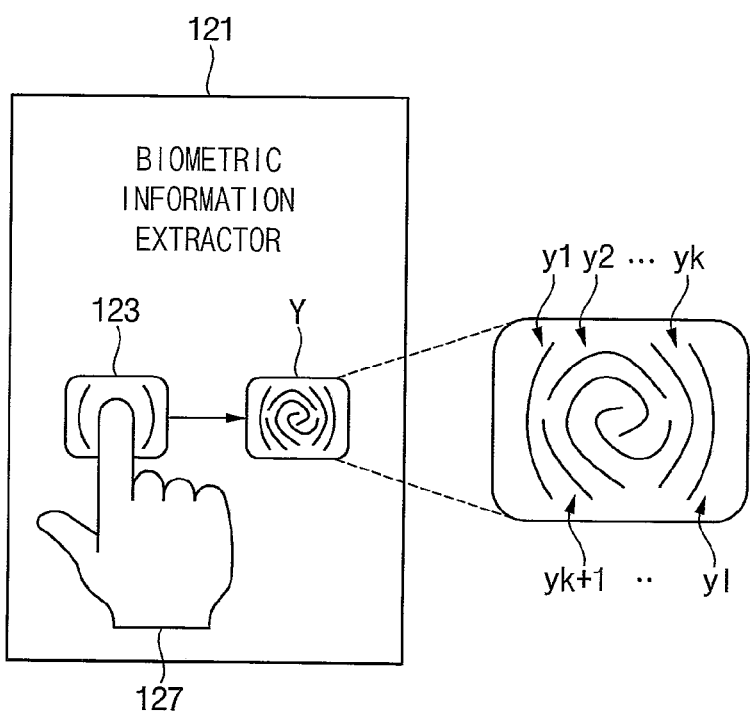

FIGS. 5A and 5B are respective conceptual diagrams illustrating operation of an apparatus included in an authentication system according to embodiments of the inventive concept.

Referring to FIGS. 3, 5A and 5B, the step of obtaining enrollment target personal information 'X' and authentication target personal information 'Y' using the biometric information extractor 121 included in the apparatus 100 further is illustrated. Here, as a working example, the enrollment target personal information X and the authentication target personal information Y are associated with fingerprint information.

As illustrated in FIG. 5A, when the step of personal information enrollment is performed (S100 of FIG. 1), the biometric information extractor 121 may obtain the enrollment target personal information X from a finger 125 of a user using (e.g.,) a fingerprint recognition window 123. That is, the enrollment target personal information X may be obtained from a first image signal or a first fingerprint image associated with (or related to) a fingerprint included in the finger 125 of the user.

As illustrated in FIG. 5B, when the step of personal information authentication is performed (S200 of FIG. 1), the biometric information extractor 121 may similarly obtain the authentication target personal information Y from a finger 127 of a user through the fingerprint recognition window 123. That is, the authentication target personal information Y may be obtained from a second image signal or a second fingerprint image associated with a fingerprint included in the finger 127 of the user.

In some embodiments, the enrollment target personal information X and the authentication target personal information Y, extracted as the biometric information, may be represented or expressed as values divided into specific sizes for each corresponding area. For example, the enrollment target personal information X may include a plurality of values $x_1, x_2, \ldots, x_k, x_{k+1}, \ldots, x_l$, and the authentication target personal information Y may include a plurality of values $y_1, y_2, y_k, y_{k+1}, \ldots, y_l$, where k is a natural number greater than two and l is a natural number greater than (k+1). Hence, the plurality of values $x_1$ to $x_l$ and $y_1$ to $y_l$ may include information (or data) corresponding to ridges and valleys of the fingerprint included in the fingerprint image.

In some embodiments, the enrollment target personal information X and the authentication target personal information Y may be expressed as Equation 1 and Equation 2, respectively.

$$X=(x_i)_{i\in[1,2,\ldots,l]}, x_i\in[0,1,2,\ldots,255] \quad \text{[Equation 1]}$$

$$Y=(y_i)_{i\in[1,2,\ldots,l]}, y_i\in[0,1,2,\ldots,255] \quad \text{[Equation 2]}$$

In other example embodiments, the enrollment target personal information X and the authentication target personal information Y may be expressed as Equation 3 and Equation 4, respectively.

$$X=(x_i)i\in_{[1,2,\ldots,l]}, x_i=(xR_i, xG_i, xB_i), xR_i,$$
$$xG_i, xB_i\in[0,1,2,\ldots,255] \quad \text{[Equation 3]}$$

$$Y=(y_i)_{i\in[1,2,\ldots,l]}, y_i=(yR_i, yG_i, yB_i), yR_i,$$
$$yG_i, yB_i\in[0,1,2,\ldots 255] \quad \text{[Equation 4]}$$

Figure 6:
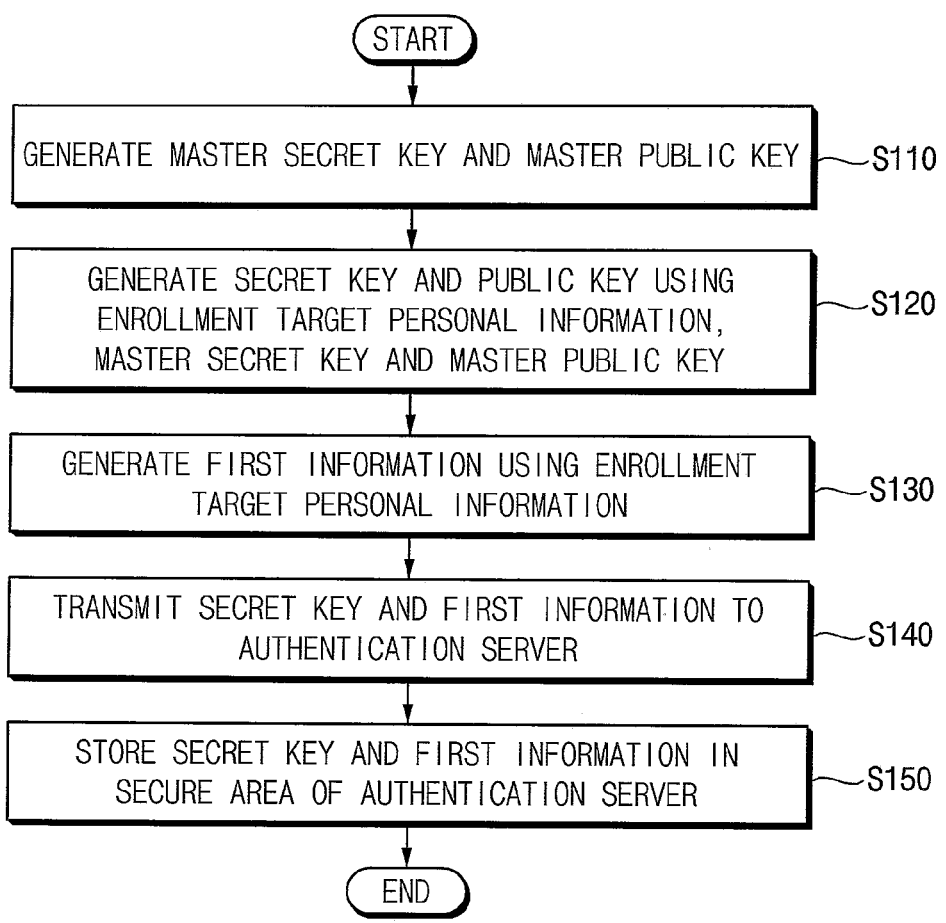
FIG. 6 is a flowchart illustrating in one example of the method step of performing personal information enrollment (S100) in the method of FIG. 1, and FIGS. 7A, 7B, 7C, 7D and 7E are related block diagrams further illustrating the method of FIG. 6.
Figure 7D:
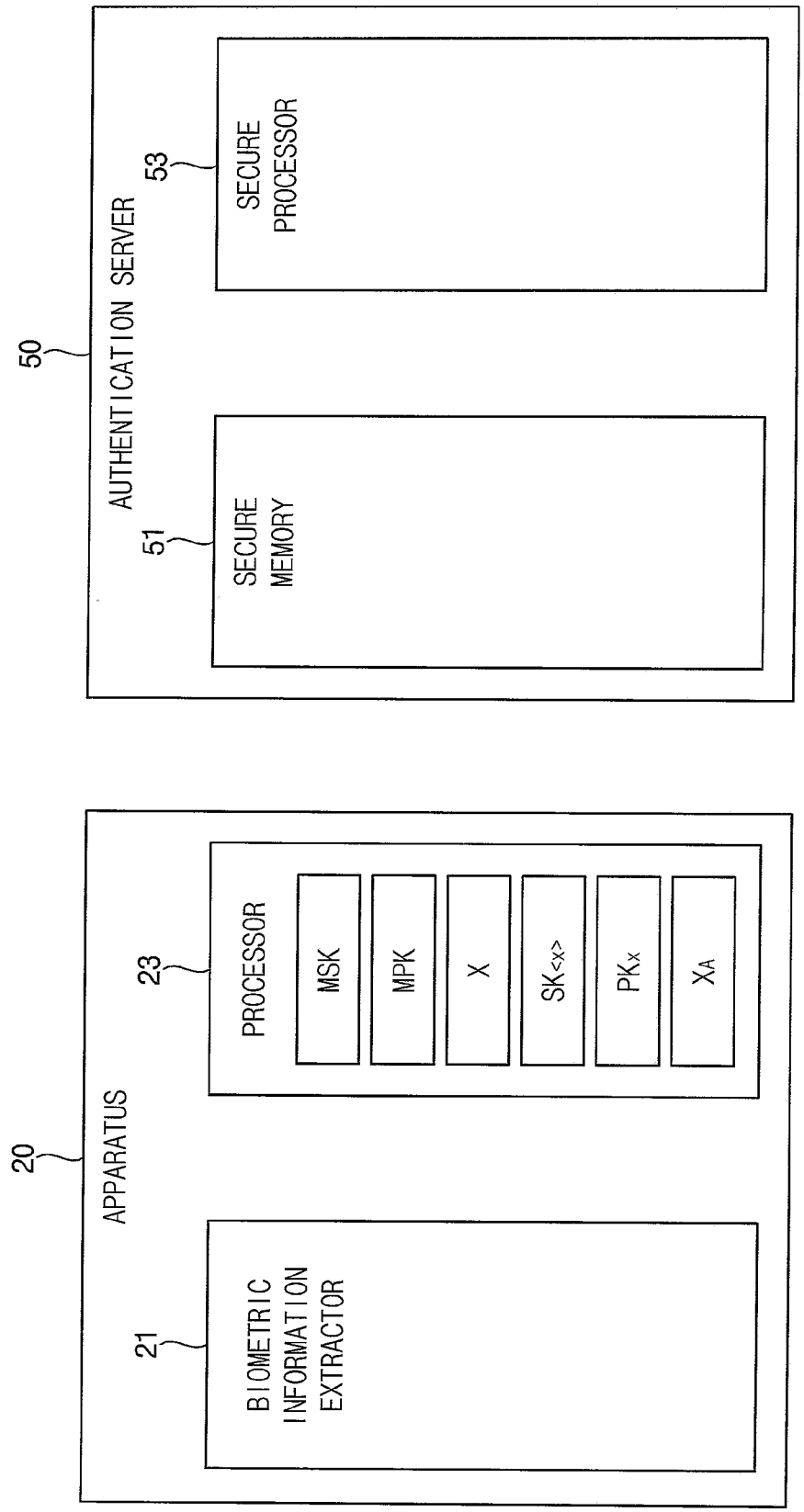
Figure 7E:
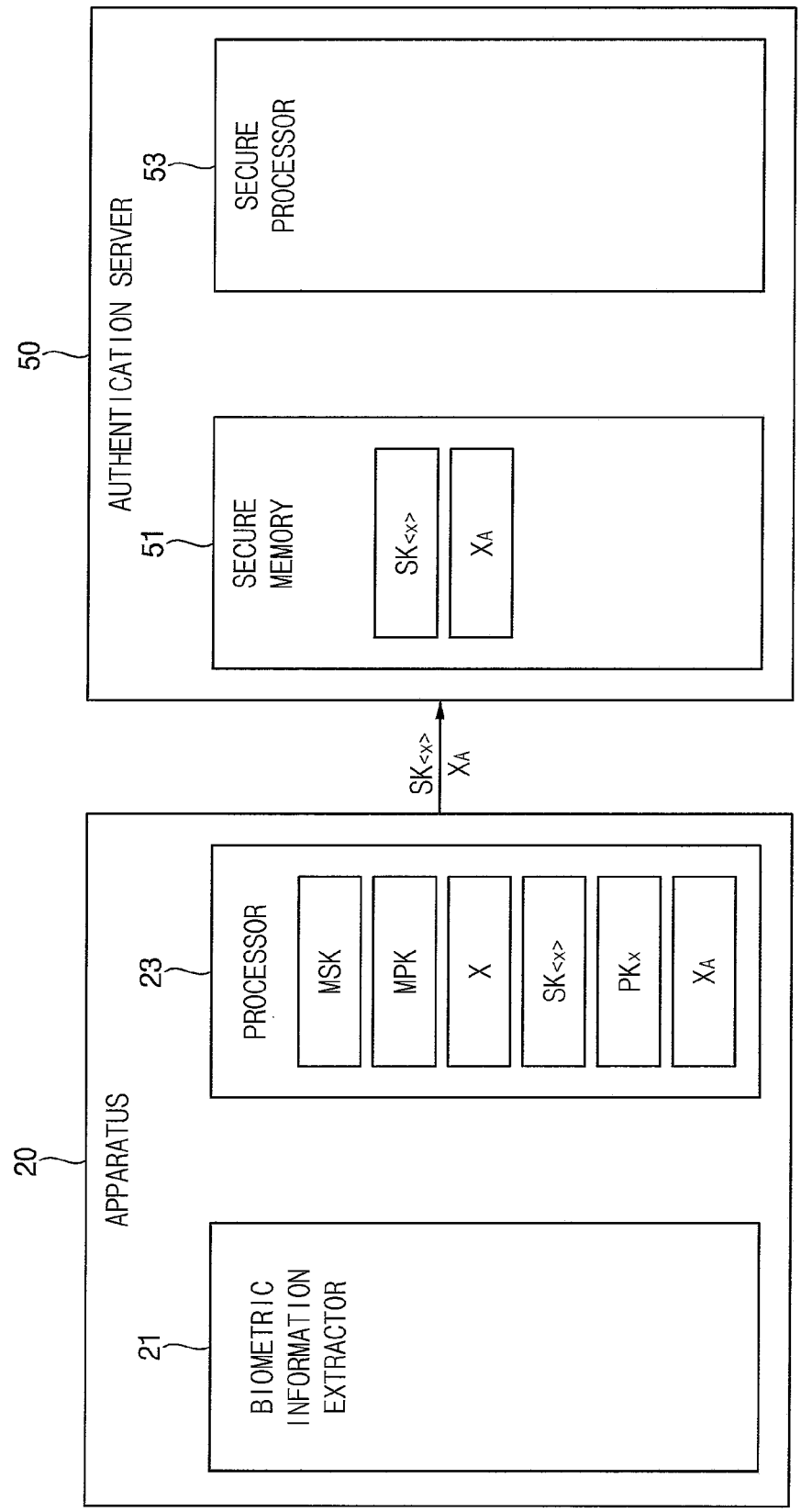

FIG. 6 is a flowchart further illustrating in one example the step of performing personal information enrollment (S100 of FIG. 1), and FIGS. 7A, 7B, 7C, 7D and 7E are related block diagrams further illustrating the apparatus 20 and the authentication server 50 of FIG. 2 in relation to the method of FIG. 6. For example, the apparatus 20 may include a biometric information extractor 21 and a processor 23 (capable of operating in a secure mode and a non-secure mode) that respectively correspond to the biometric information extractor 121 and the processor 113 of FIG. 3, and the authentication server 50 may include a secure memory 51 and a secure processor 53 respectively corresponding to a memory and a processor operating in the secure mode.

Referring to FIGS. 1, 6, 7A, 7B, 7C, 7D and 7E, when performing the method step of personal information enrollment (S100), at the apparatus 20, a master secret (or private) key MSK and a master public key MPK may be generated (e.g., the processor 23 included in the apparatus 20 may generate the master secret key MSK and the master public key MPK) (S110). For example, the master secret key MSK and the master public key MPK may be obtained in accordance with (or "based on") Equation 5, Equation 6 and Equation 7.

$$\text{GroupGen}(1^\lambda) \rightarrow (\mathbb{G}, p, \langle g \rangle \in \langle h \rangle = \mathbb{G}) \quad \text{[Equation 5]}$$

$$MSK=(s,t), s \leftarrow \mathbb{Z}_p^l, t \leftarrow \mathbb{Z}_p^l \quad \text{[Equation 6]}$$

$$MPK=(h_i=g^{s_i}h^{t_i})_{i\in[1,2,\ldots,l]} \quad \text{[Equation 7]}$$

Next, at the apparatus 20, the enrollment target personal information X may be obtained from the biometric information extractor 21 (e.g., the processor 23 included in the apparatus 20 may obtain the enrollment target personal information X from the biometric information extractor 21). Thereafter, at the apparatus 20, a secret key $SK_{<x>}$ and a public key $PK_x$ may be generated using the enrollment target personal information X, the master secret key MSK and the master public key MPK (e.g., the processor 23 included in the apparatus 20 may generate the secret key $SK_{<x>}$ and the public key $PK_x$ using the enrollment target personal information X, the master secret key MSK and the master public key MPK) (step S120). For example, the secret key $SK_{<x>}$ and the public key $PK_x$ may be obtained based on Equation 8, Equation 9 and Equation 10.

$$\text{KeyGen}(MSK, MPK, X, <>) \rightarrow SK(_x), PK_x \quad \text{[Equation 8]}$$

$$SK(_x)=(s_x=\langle X,s\rangle, t=\langle X,t\rangle) \quad \text{[Equation 9]}$$

$$PK_x=\{w_i=h_i^{x_i}, v_i=g^{x_i}\}_{i\in[1,l]} \quad \text{[Equation 10]}$$

In Equation 8 and Equation 9, a symbol < > represents an inner product. That is, the secret key $SK_{<x>}$ may be obtained by calculating the inner product.

Thereafter, at the apparatus 20, first information $X_A$ may be generated using the enrollment target personal information X (e.g., the processor 23 included in the apparatus 20 may generate the first information $X_A$ using the enrollment target personal information X) (S130). For example, the first information $X_A$ may be obtained based on Equation 11.

$$X_A=g^{\langle X,X\rangle} \quad \text{[Equation 11]}$$

In some embodiments, the first information $X_A$ may be obtained by calculating an inner product. In the authentication method according to example embodiments, the first information $X_A$ that is used to perform the personal information authentication process of step S200 may be additionally generated. That is, when performing the method step of personal information authentication (S200 of FIG. 1), not only the public key $PK_x$, but also the first information $X_A$ may be used.

Thereafter, at the apparatus 20, the secret key $SK_{<x>}$ and the first information $X_A$ may be communicated to the authentication server 50 (e.g., the processor 23 included in the apparatus 20 may communicate the secret key $SK_{<x>}$ and the first information $X_A$ to the authentication server 50 (S140). The secret key $SK_{<x>}$ and the first information $X_A$ may be stored in a secure area (e.g., in the secure memory 51) of the authentication server 50 (S150).

In some embodiments, some or all of S110, S120 and S130 may be performed in the secure mode of the apparatus 20. In other embodiments, some or all of S110, S120 and S130 may be performed in the non-secure mode of the apparatus 20. In addition, some or all of the master secret key MSK, the master public key MPK, the enrollment target personal information X, the secret key $SK_{<x>}$, the public key $PK_x$ and the first information $X_A$ may be stored in a storage area (e.g., a secure area or a secure memory) of the apparatus 20.

Figure 8:
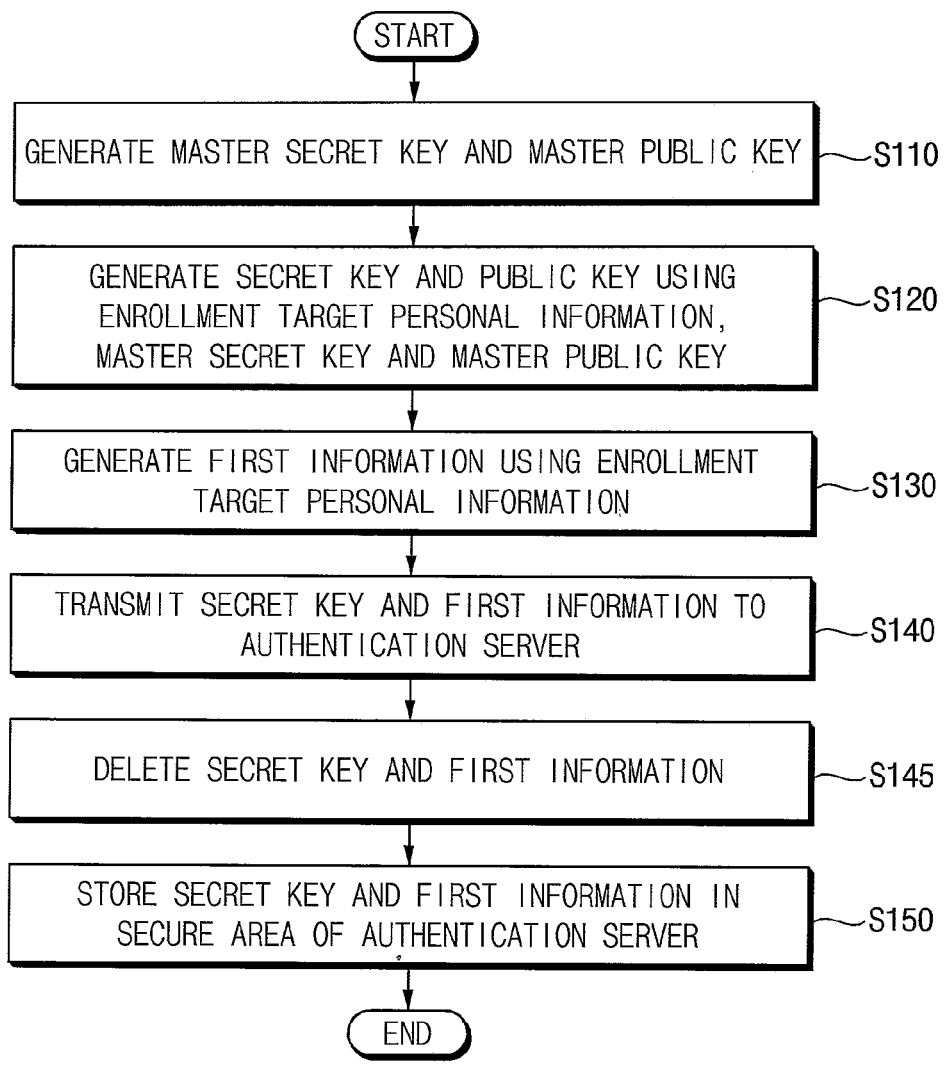
FIG. 8 is a flowchart illustrating in another example of the method step of performing personal information enrollment in the method of FIG. 1.
Figure 9:
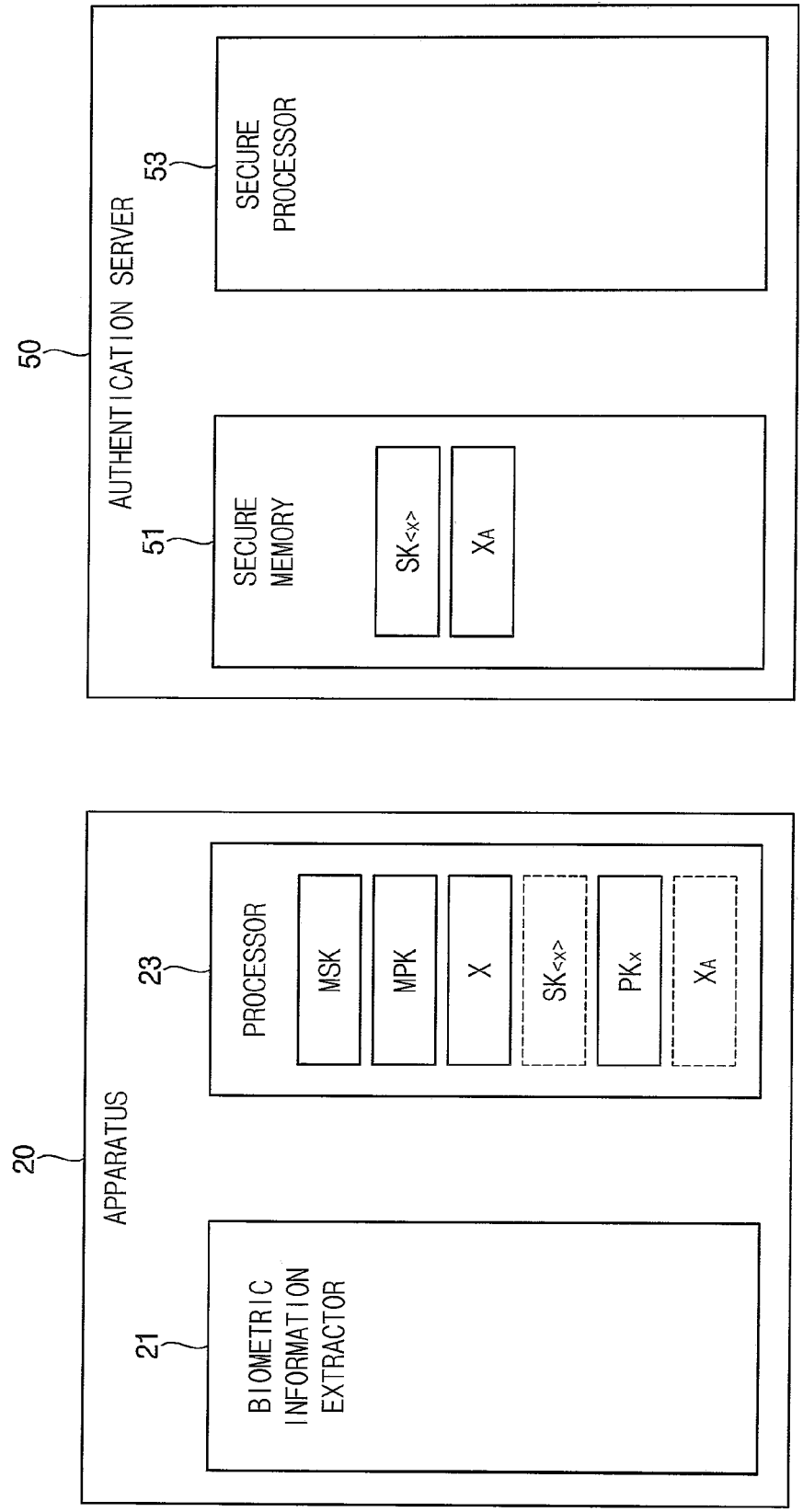
FIG. 9 is a block diagram further illustrating the method of FIG. 8.

FIG. 8 is a flowchart illustrating in another example the method step of performing a personal information enrollment (S100 of FIG. 1), and FIG. 9 is a block diagram further illustrating the method of FIG. 8.

Comparing the method of FIG. 8 to the method of FIG. 6, the method step of performing personal information enrollment (S100 in FIG. 1) may additionally include deleting the secret key and the first information (S145).

That is, after communicating the secret key $SK_{<x>}$ and the first information $X_A$ from the apparatus 20 to the authentication server 50 (S140), at the apparatus 20, the secret key $SK_{<x>}$ and the first information $X_A$ may be deleted (S145). Since the step of performing personal information authentication (S200 of FIG. 1) (e.g., an authentication for the authentication target personal information Y in S240 of FIG. 12) is performed at the authentication server 50, and since the secret key $SK_{<x>}$ and the first information $X_A$ are safely stored in the secure area (e.g., in the secure memory 51) of the authentication server 50, the secret key $SK_{<x>}$ and the first information $X_A$ are no longer required by the apparatus 20 may thereafter be deleted. Accordingly in FIG. 9, the secret key $SK_{<x>}$ and the first information $X_A$ are shown in dotted lines indicating deletion from the apparatus 20.

In some embodiments, at the apparatus 20, the secret key $SK_{<x>}$ and the first information $X_A$ may be physically erased from memory (e.g., a designated storage area, a designated portion of memory, and/or a designated register, etc.) storing same. As noted above, the secret key $SK_{<x>}$ and the first information $X_A$ may be stored in the storage area of the apparatus 20, and thus the secret key $SK_{<x>}$ and the first information $X_A$ may be deleted from the processor 23 as well as physically erased from the storage area such that it impossible to restore or reconstruct the secret key $SK_{<x>}$ and the first information $X_A$ in the apparatus 20. For example, when the storage area is included in a nonvolatile memory such as a flash memory, the secret key $SK_{<x>}$ and the first information $X_A$ may be physically erased by performing an erase operation where an erase voltage is applied to the storage area.

Figure 10:
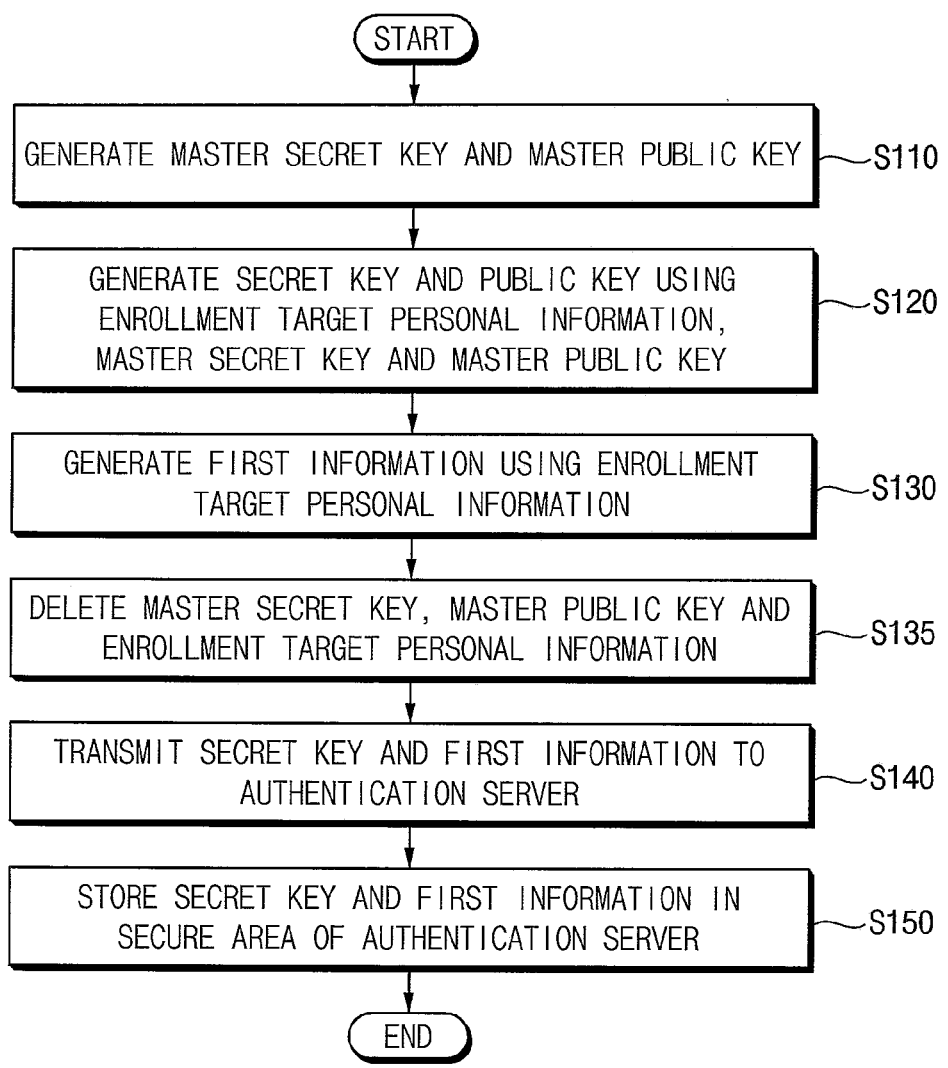
FIG. 10 is a flowchart illustrating still another example of the method step of performing personal information enrollment in the method of FIG. 1.
Figure 11:
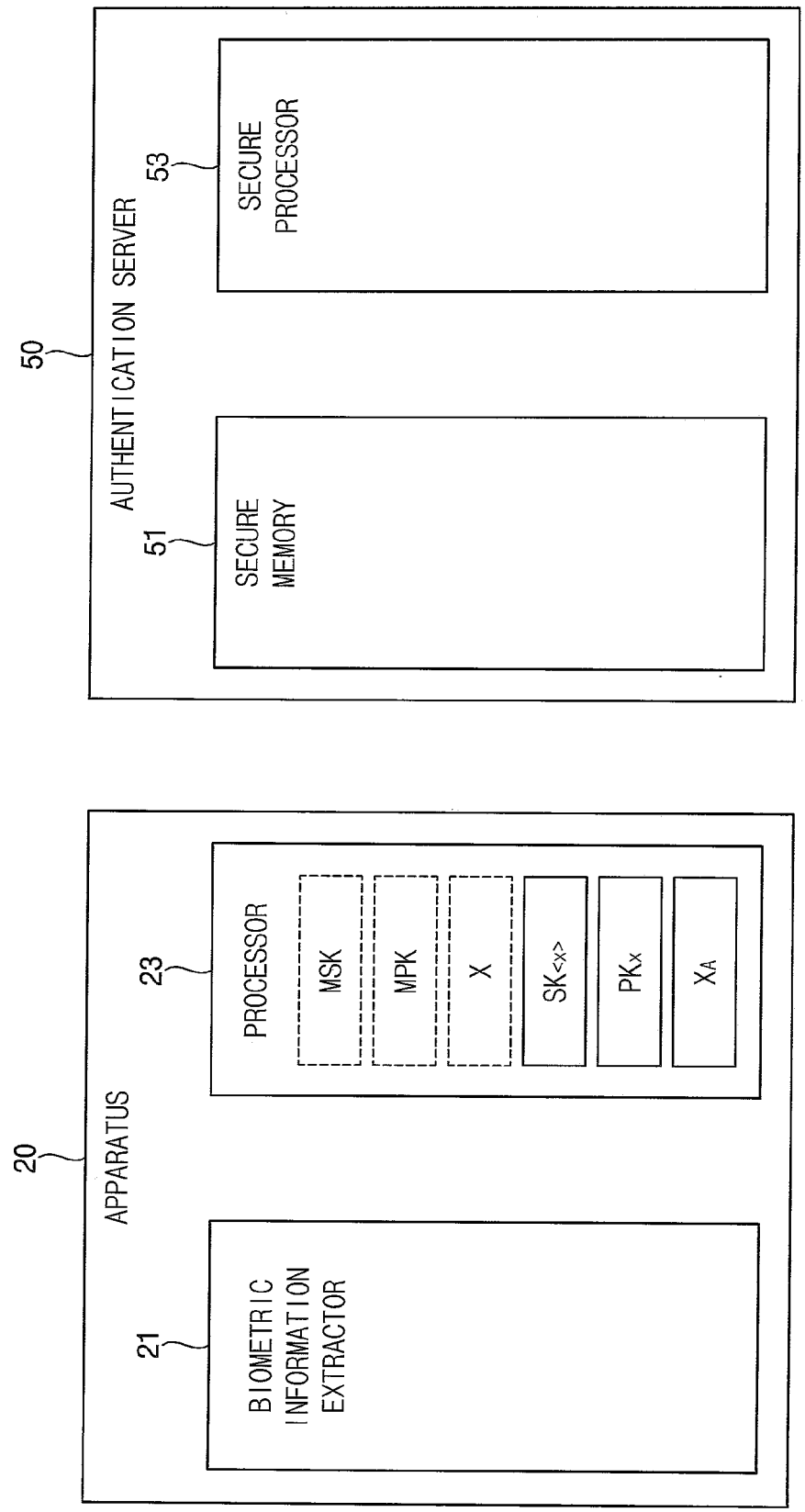
FIG. 11 is a block diagram further illustrating the method of FIG. 10.

FIG. 10 is a flowchart illustrating in still another example the method step of performing personal information enrollment (S100 in FIG. 1), and FIG. 11 is a block diagram further illustrating the method of FIG. 10.

Comparing the method of FIG. 10 to the method of FIG. 6, the method step of performing personal information enrollment (S100 in FIG. 1) may additionally include the step of deleting the master secret key, master public key and enrollment target personal information (S135).

Thus, after generating the secret key $SK_{<x>}$, the public key $PK_x$ and the first information $X_A$ (S120, S130), at the apparatus 20, the master secret key MSK, the master public key MPK and the enrollment target personal information X may be deleted (S135). Since the master secret key MSK, the master public key MPK and the enrollment target personal information X are not used during personal information authentication (step S200 of FIG. 1) (e.g., authentication for the authentication target personal information Y in S240 of FIG. 12), the master secret key MSK, the master public key MPK and the enrollment target personal information X that are no longer required by the apparatus 20 may be deleted (S135).

In some embodiments, at the apparatus 20, the master secret key MSK, the master public key MPK and the enrollment target personal information X may be physically erased.

In some embodiments, both S145 of FIG. 8 and step S135 of FIG. 10 may be performed.

Figure 12:
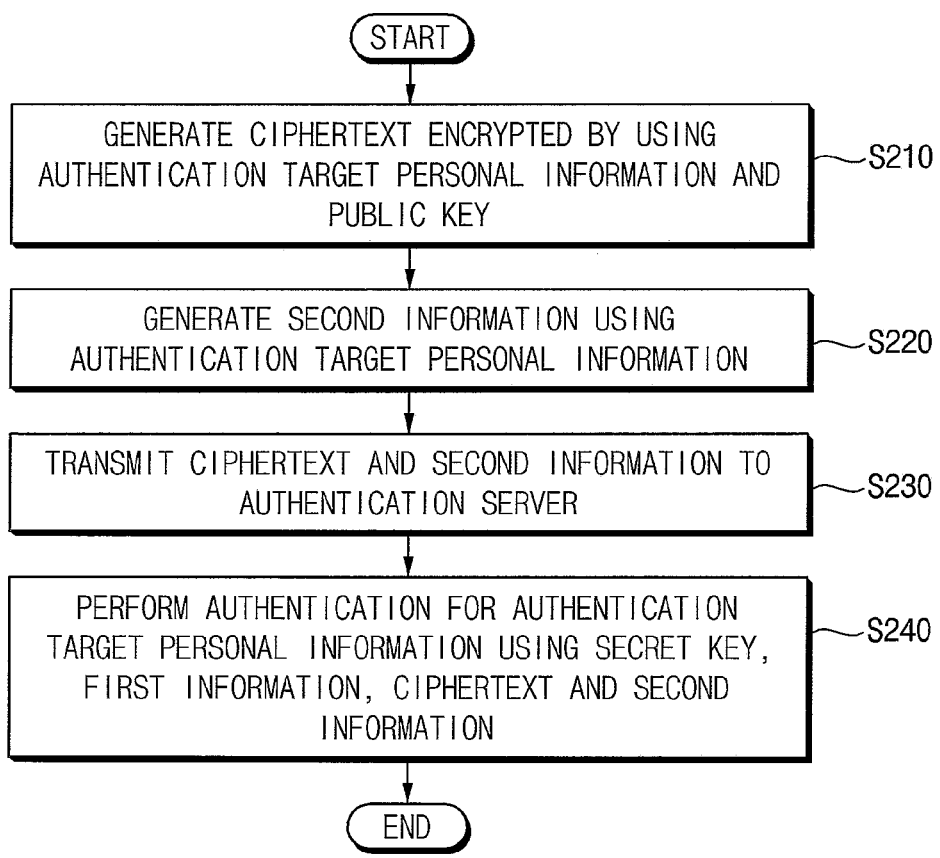
FIG. 12 is a flowchart illustrating in one example the method step of performing personal information authentication in the method of FIG. 1, and FIGS. 13A, 13B, 13C, 13D and 13E are related block diagrams further illustrating the method of FIG. 12.
Figure 13A:
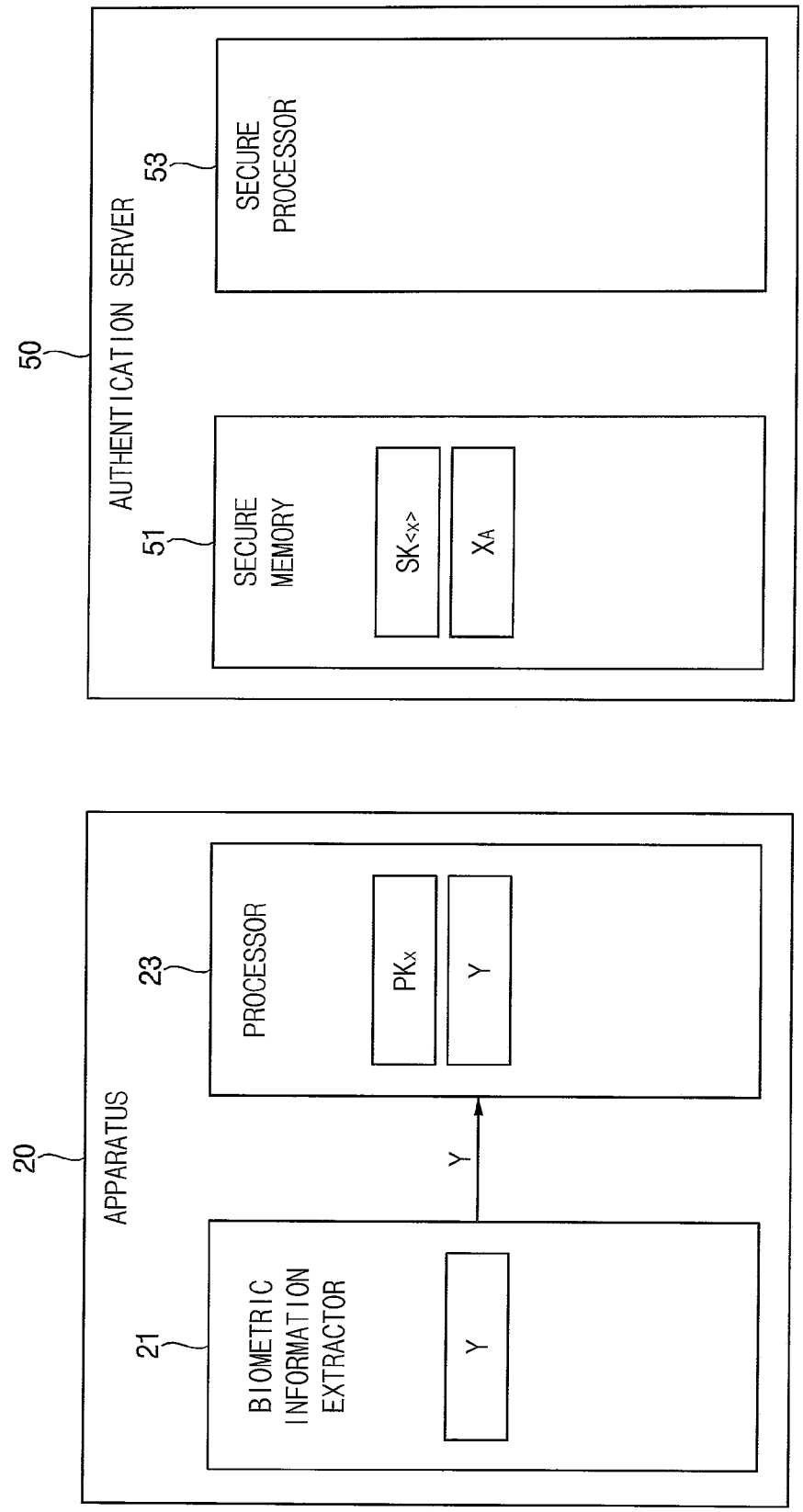
Figure 13B:
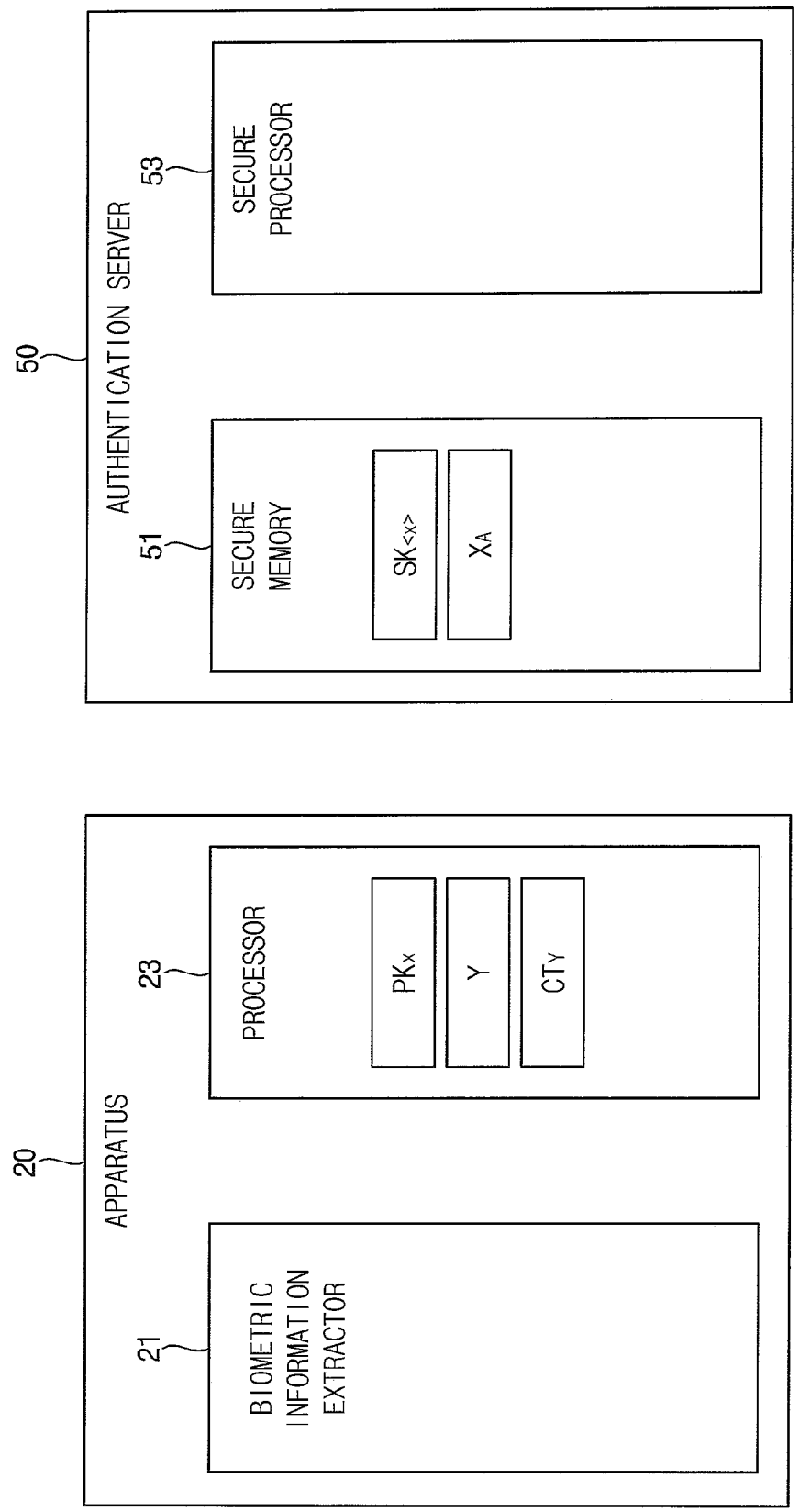
Figure 13C:
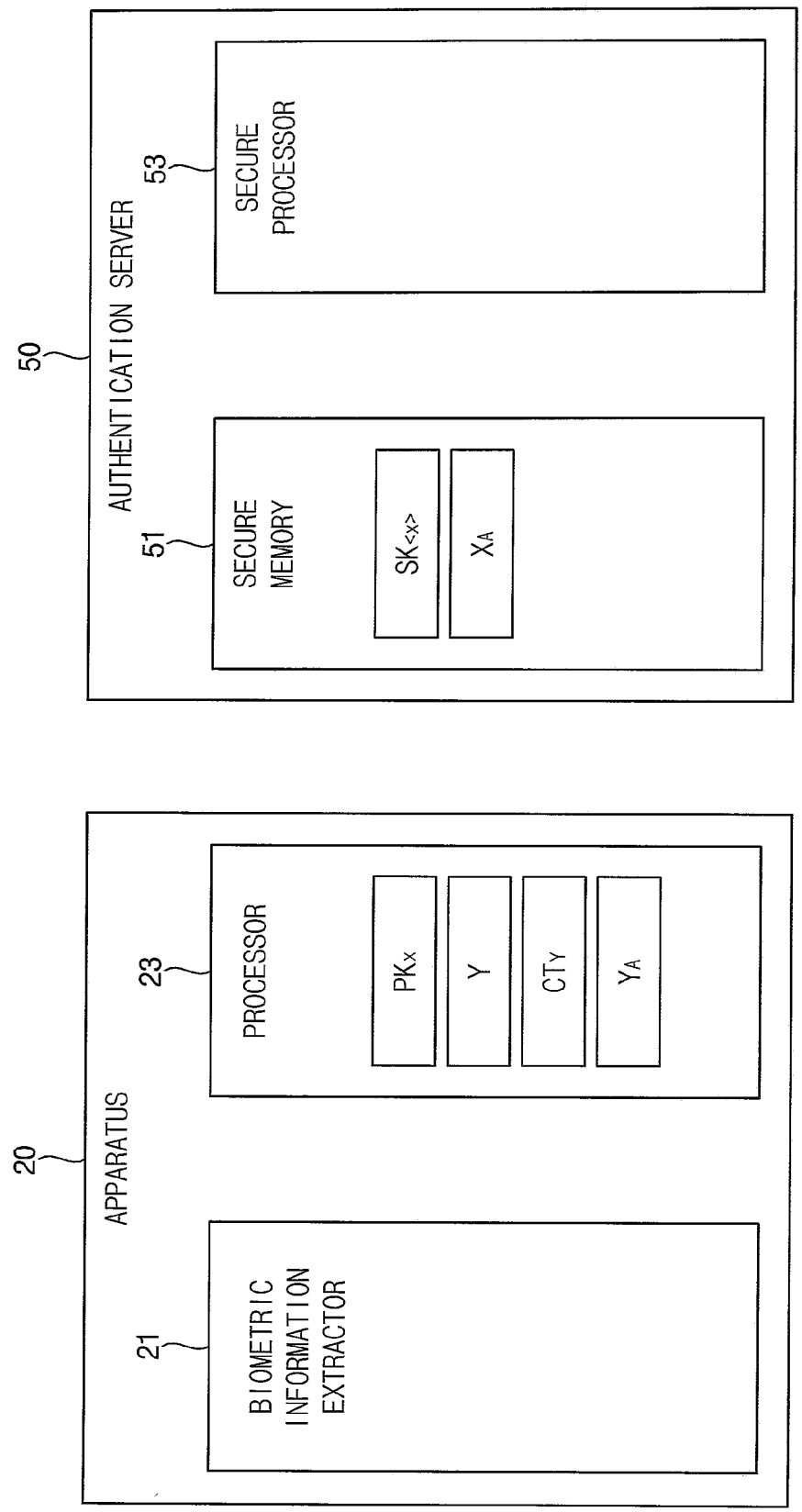
Figure 13D:
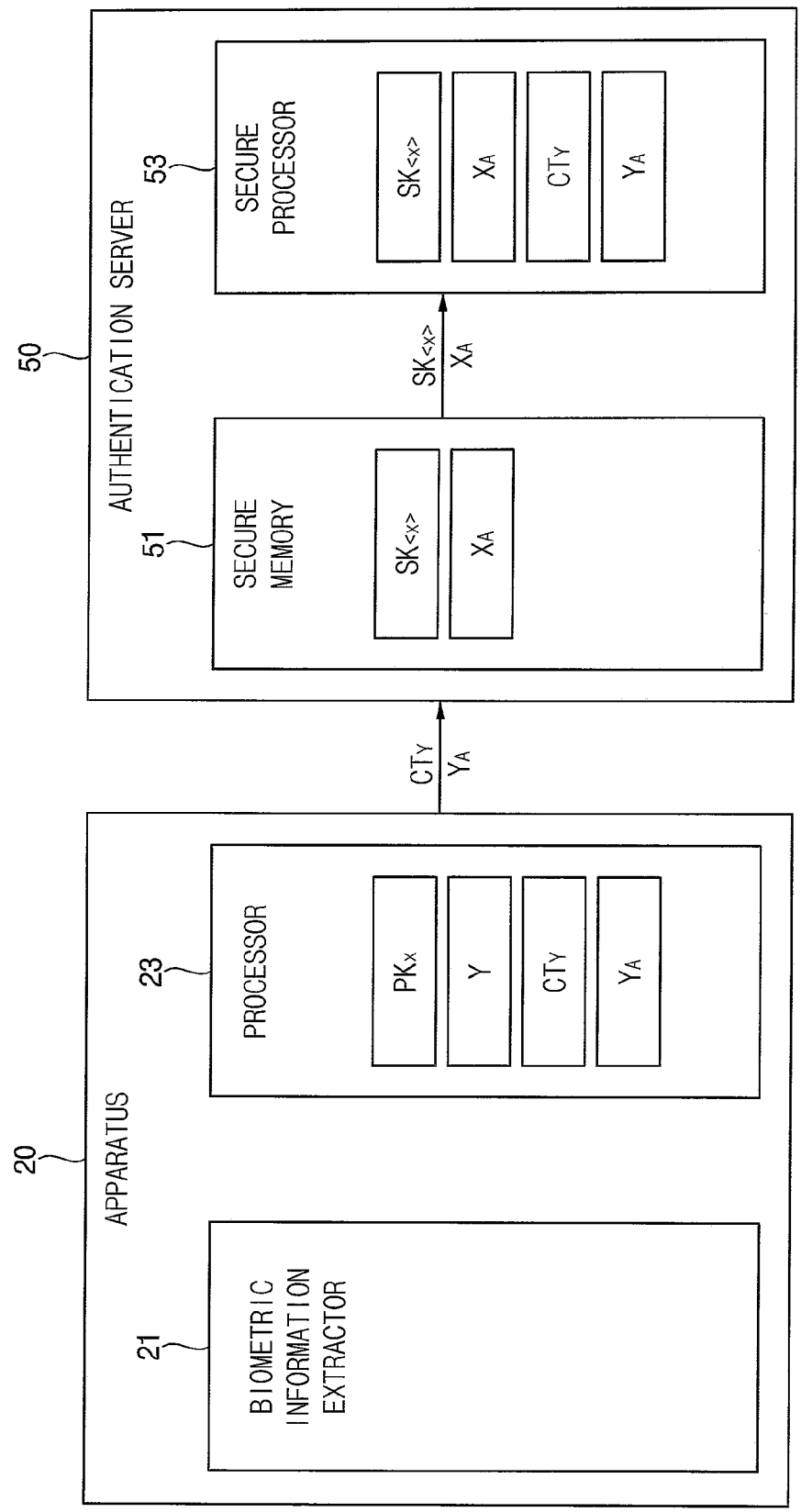
Figure 13E:
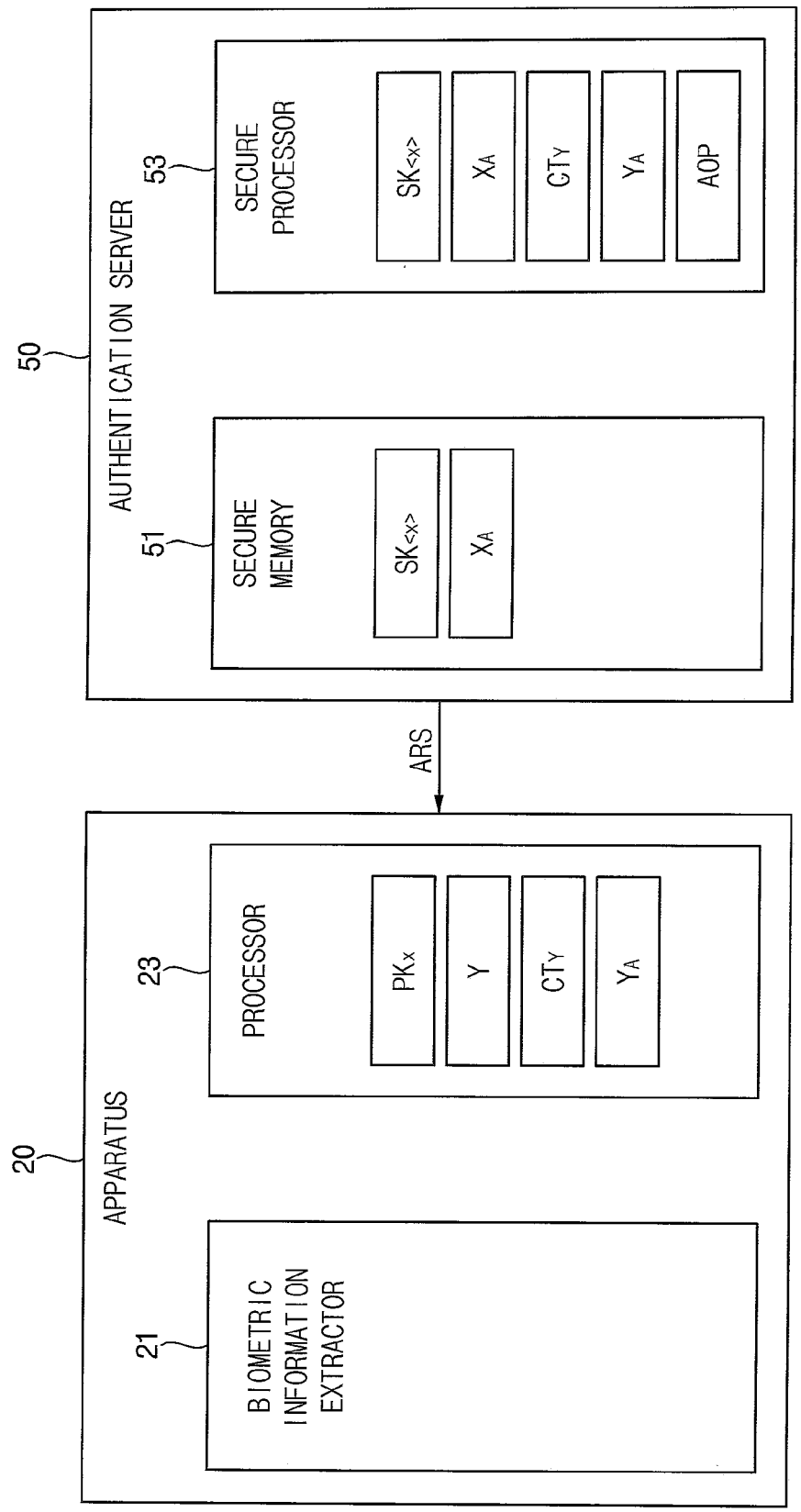

FIG. 12 is a flowchart illustrating in one example the method step of performing personal information authentication (S200 in FIG. 1), and FIGS. 13A, 13B, 13C, 13D and 13E are related block diagrams further illustrating the method of FIG. 12.

Referring to FIGS. 1, 12, 13A, 13B, 13C, 13D and 13E, the method step of performing personal information authentication (S200 in FIG. 1) may be proceeded by method step(s) performed by the apparatus 20 wherein the authentication target personal information Y is obtained from the biometric information extractor 21 (e.g., the processor 23 included in the apparatus 20 may obtain the authentication target personal information Y from the biometric information extractor 21). Further, at the apparatus 20, the public key $PK_x$ may be obtained (e.g., the processor 23 included in the apparatus 20 may obtain the public key $PK_x$ from the storage area of the apparatus 20).

Thereafter, at the apparatus 20, a ciphertext $CT_Y$ encrypted using the authentication target personal information Y and the public key $PK_x$ may be generated (e.g., the processor 23 included in the apparatus 20 may generate the ciphertext $CT_Y$ encrypted using the authentication target personal information Y and the public key $PK_x$) (S210). For example, the ciphertext $CT_Y$ may be obtained based on Equation 12 and Equation 13.

$$\text{Encrypt}(PK_x, Y) \to CT_Y = (C, D, E) \qquad [\text{Equation 12}]$$

$$r \leftarrow \mathbb{Z}_p, C = g^r, D = h^r, E = n_{i=1}^l w_i^r \cdot v_i^{y_i} \qquad [\text{Equation 13}]$$

Thereafter, at the apparatus 20, second information $Y_A$ may be generated using the authentication target personal information Y (e.g., the processor 23 included in the apparatus 20 may generate the second information $Y_A$ using the authentication target personal information Y) (S220). For example, the second information $Y_A$ may be obtained based on Equation 14.

$$Y_A = g\langle Y, Y \rangle \qquad [\text{Equation 14}]$$

In some embodiments, as with the first information $X_A$, the second information $Y_A$ may be obtained by calculating an inner product. Thus, the second information $Y_A$ that is used to perform the personal information authentication process of step S200 may be additionally generated. Accordingly, when performing the method step of personal information authentication (S200 of FIG. 1), not only the ciphertext $CT_Y$, but also the second information $Y_A$ may be used.

Thereafter, at the apparatus 20, the ciphertext $CT_Y$ and the second information $Y_A$ may be communicated to the authentication server 50 (e.g., the processor 23 included in the apparatus 20 may communicate the ciphertext $CT_Y$ and the second information $Y_A$ to the authentication server 50) (step S230). The ciphertext $CT_Y$ and the second information $Y_A$ may be provided to the secure processor 53 of the authentication server 50. In addition, at the authentication server 50, the secret key $SK_{<x>}$ and the first information $X_A$ may be obtained (e.g., the secure processor 53 included in the authentication server 50 may obtain the secret key $SK_{<x>}$ and the first information $X_A$ from the secure area (e.g., the secure memory 51) of the authentication server 50).

Thereafter, at the authentication server 50, an authentication AOP for the authentication target personal information Y may be performed using the secret key $SK_{<x>}$, the first information $X_A$, the ciphertext $CT_Y$ and the second information $Y_A$ (e.g., the secure processor 53 included in the authentication server 50 may perform the authentication AOP for the authentication target personal information Y using the secret key $SK_{<x>}$, the first information $X_A$, the ciphertext $CT_Y$ and the second information $Y_A$) (step S240). At the authentication server 50, an authentication result signal ARS representing a success or failure of the authentication AOP may be communicated to the apparatus 20 (e.g., the secure processor 53 included in the authentication server 50 may generate the authentication result signal ARS and may communicate the authentication result signal ARS to the apparatus 20).

In some embodiments, some or both of S210 and S220 may be performed in the secure mode of the apparatus 20. In other embodiments, some or both of S210 and S220 may be performed in the non-secure mode of the apparatus 20. In addition, some or all of the authentication target personal information Y, the ciphertext $CT_Y$ and the second information $Y_A$ may be stored in the storage area (e.g., the secure area or the secure memory) of the apparatus 20. Method step S240 may be performed in the secure mode of the authentication server 50. Some or both of the ciphertext $CT_Y$ and the second information $Y_A$ may be stored in the secure memory 51 of the authentication server 50.

Figure 14:
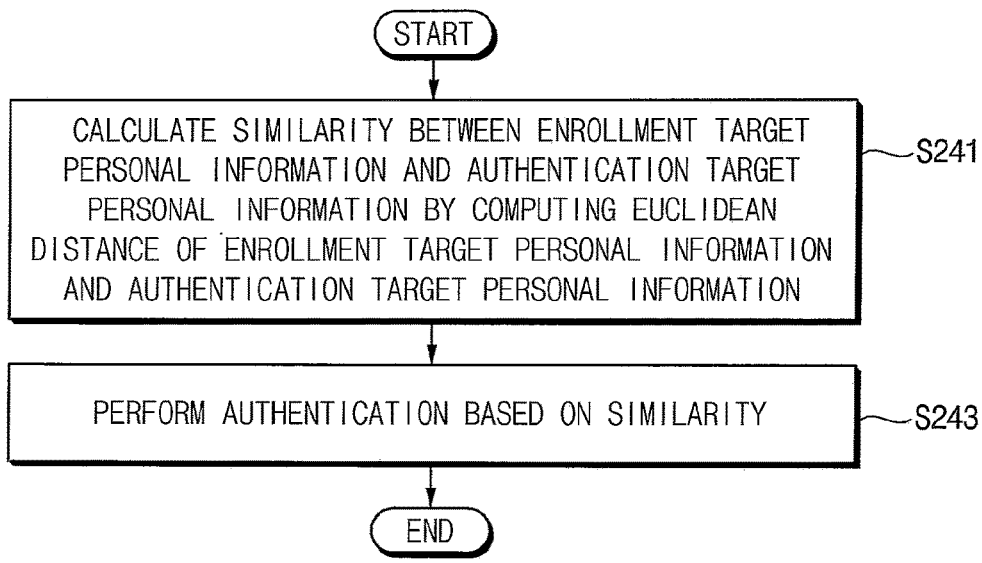
FIG. 14 is a flowchart further illustrating in one example the method step of performing authentication for authentication target personal information in the method of FIG. 12.

FIG. 14 is a flowchart further illustrating in one example the step of performing authentication for authentication target personal information (S240 in FIG. 12).

Referring to FIGS. 12 and 14, when performing authentication for the authentication target personal information (S240), a similarity between the enrollment target personal information X and the authentication target personal information Y may be calculated by computing an Euclidean distance of the enrollment target personal information X and the authentication target personal information Y (S241), and authentication for the authentication target personal information Y may be performed based on the similarity (S243).

For example, the Euclidean distance may be obtained based on Equation 15, and the authentication may be performed based on Equation 16.

$$ED(X,Y)=\Sigma_{i=1}^{l}(x_i-y_i)^2=\langle X-Y,X-Y\rangle=\langle X,X\rangle -2\langle X,Y\rangle+\langle Y,Y\rangle \quad \text{[Equation 15]}$$

$$0 \leq ED(X,Y) < thr \quad \text{[Equation 16]}$$

When the Euclidean distance is greater than or equal to zero, and less than a threshold value thr, it may be determined that the authentication has been successfully completed. However, when the Euclidean distance is greater than or equal to the threshold value thr, it may be determined that authentication has failed. However, if steps S241 and S243 are performed based on Equation 15 and Equation 16, the enrollment target personal information X and the authentication target personal information Y should be directly used.

In authentication methods according to embodiments of the inventive concept, the Euclidean distance of the enrollment target personal information X and the authentication target personal information Y may be computed without exposing the enrollment target personal information X and the authentication target personal information Y.

In some embodiments, the Euclidean distance of the enrollment target personal information X and the authentication target personal information Y may be computed using only the secret key $SK_{\langle x \rangle}$, the first information $X_A$, the ciphertext $CT_Y$ and the second information $Y_A$, without directly using the enrollment target personal information X and the authentication target personal information Y. For example, S241 and S243 may be performed based on Equation 17, Equation 18, Equation 19 and Equation 20.

$$\text{Decrypt } (SK_{\langle X \rangle}, CT_Y) \to \langle X, Y \rangle \quad \text{[Equation 17]}$$

$$\frac{E}{C^s X \cdot D^t X} = g^{\langle X,Y \rangle} \quad \text{[Equation 18]}$$

$$X_A \cdot \text{Decrypt } (SK_x, CT_Y)^{-2} \cdot Y_A = g^{\langle X-Y,X-Y \rangle} \quad \text{[Equation 19]}$$

Measure Similarity: [Equation 20]

$$\Leftrightarrow 0 \leq ED(X, Y) < thr$$

$$\Leftrightarrow g^{\langle X-Y,X-Y \rangle} \in \{g^0=1, g^1, g^2, \ldots, g^{thr-1}\}?$$

That is, the authentication may be performed by determining whether $g^{\langle X-Y,X-Y \rangle}$, which is obtained using the secret key $SK_{\langle x \rangle}$, the first information $X_A$, the ciphertext $CT_Y$ and the second information $Y_A$, corresponds to any one of $g^0, g^1, g^2, \ldots, g^{thr-1}$, rather than by directly comparing the Euclidean distance ED(X,Y), which is obtained by directly using the enrollment target personal information X and the authentication target personal information Y, with the threshold value thr. For example, the threshold value thr may be variously determined according to example embodiments.

In authentication methods according to embodiments of the inventive concept, the authentication may be performed using only the secret key $SK_{\langle x \rangle}$, the first information $X_A$, the ciphertext $CT_Y$ and the second information $Y_A$, without directly using the enrollment target personal information X and the authentication target personal information Y. Accordingly, personal authentication may be performed more securely and efficiently without exposing the enrollment target personal information X and the authentication target personal information Y.

Figure 15:
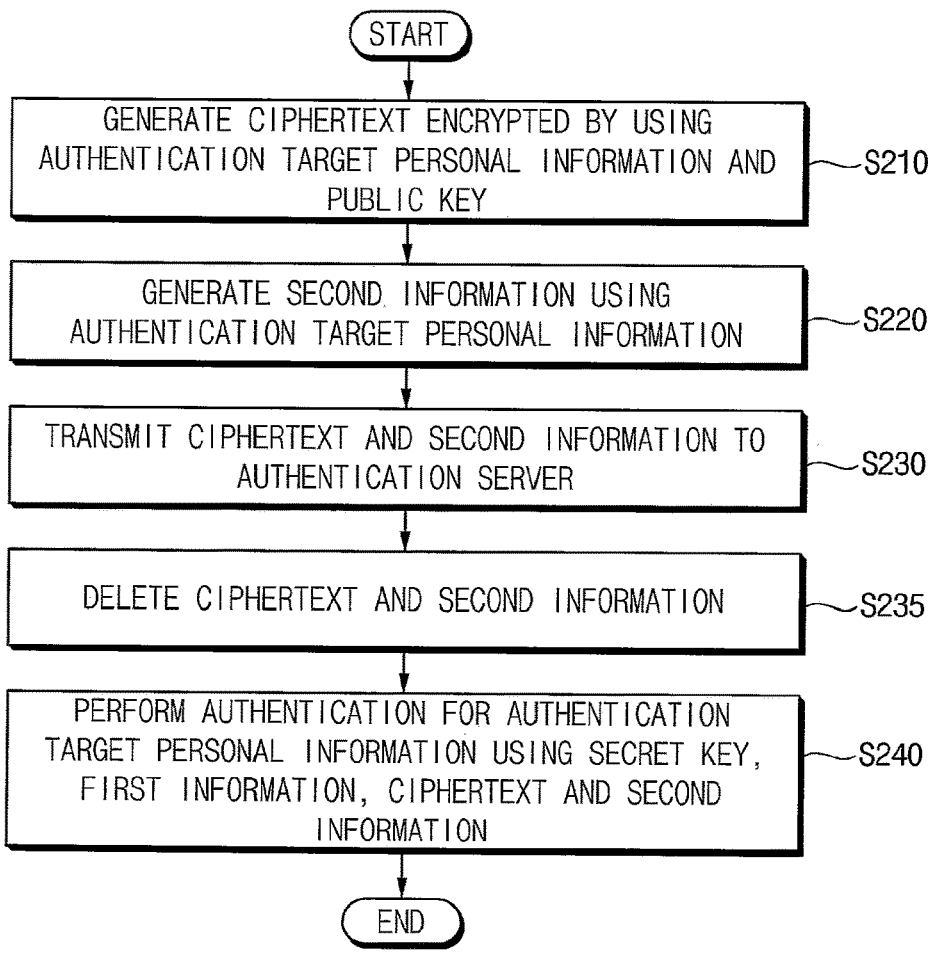
FIG. 15 is a flowchart illustrating in another example the method step of performing personal information authentication in the method of FIG. 1.
Figure 16:
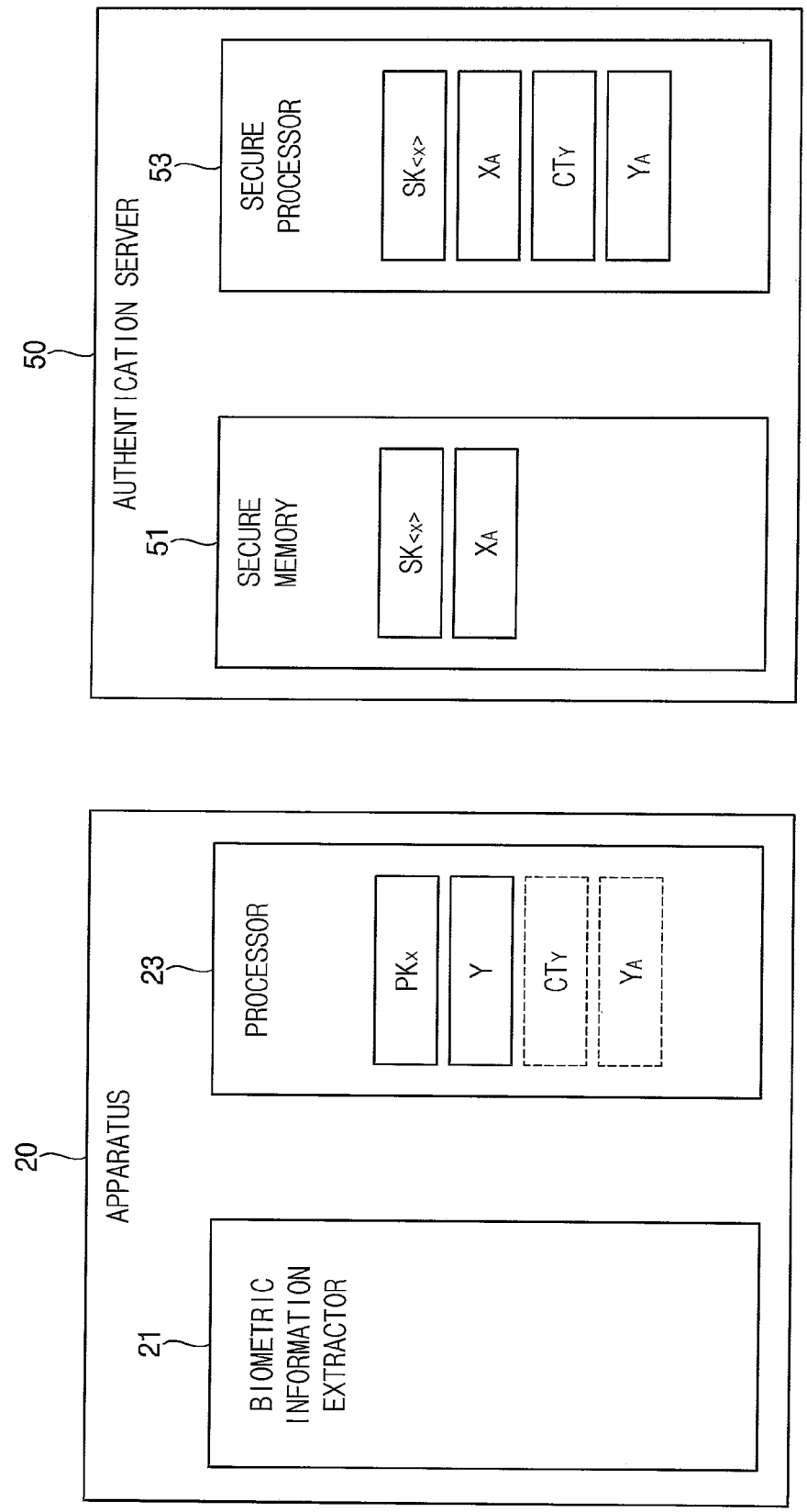
FIG. 16 is a block diagram further illustrating the method of FIG. 15.

FIG. 15 is a flowchart illustrating in another example the method step of performing personal information authentication (S200 of FIG. 1), and FIG. 16 is a block diagram further illustrating the method of FIG. 15.

Comparing the method of FIG. 15 to the method of FIG. 12, the method step of performing personal information authentication process (S200) may further include deleting the ciphertext and second information (S235).

That is, after communicating the ciphertext $CT_Y$ and the second information $Y_A$ from the apparatus 20 to the authentication server 50 (S230), at the apparatus 20, the ciphertext $CT_Y$ and the second information $Y_A$ may be deleted (S235). Since the authentication (S240) is performed by the authentication server 50, the ciphertext $CT_Y$ and the second information $Y_A$ are no longer required by the apparatus 20 may be deleted.

In some embodiments, at the apparatus 20, the ciphertext $CT_Y$ and the second information $Y_A$ may be physically erased.

Figure 17:
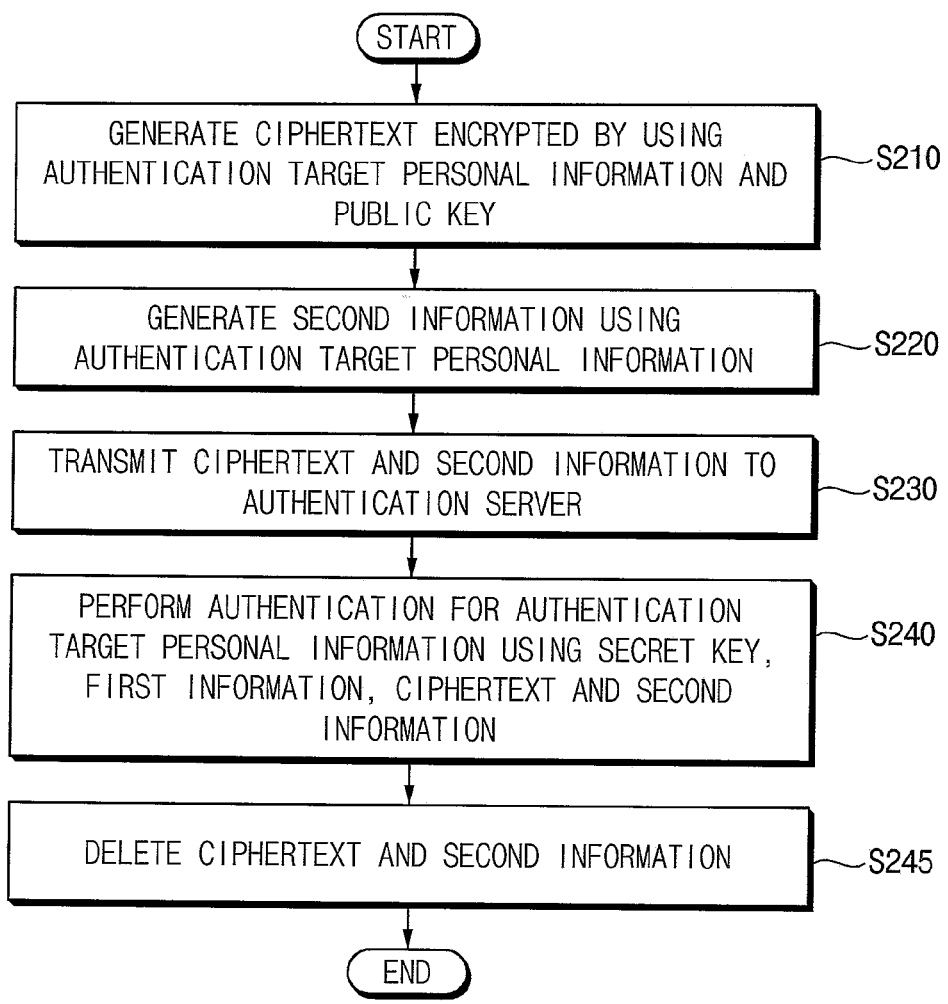
FIG. 17 is a flowchart illustrating in still another example the method step of performing personal information authentication in the method of FIG. 1.
Figure 18:
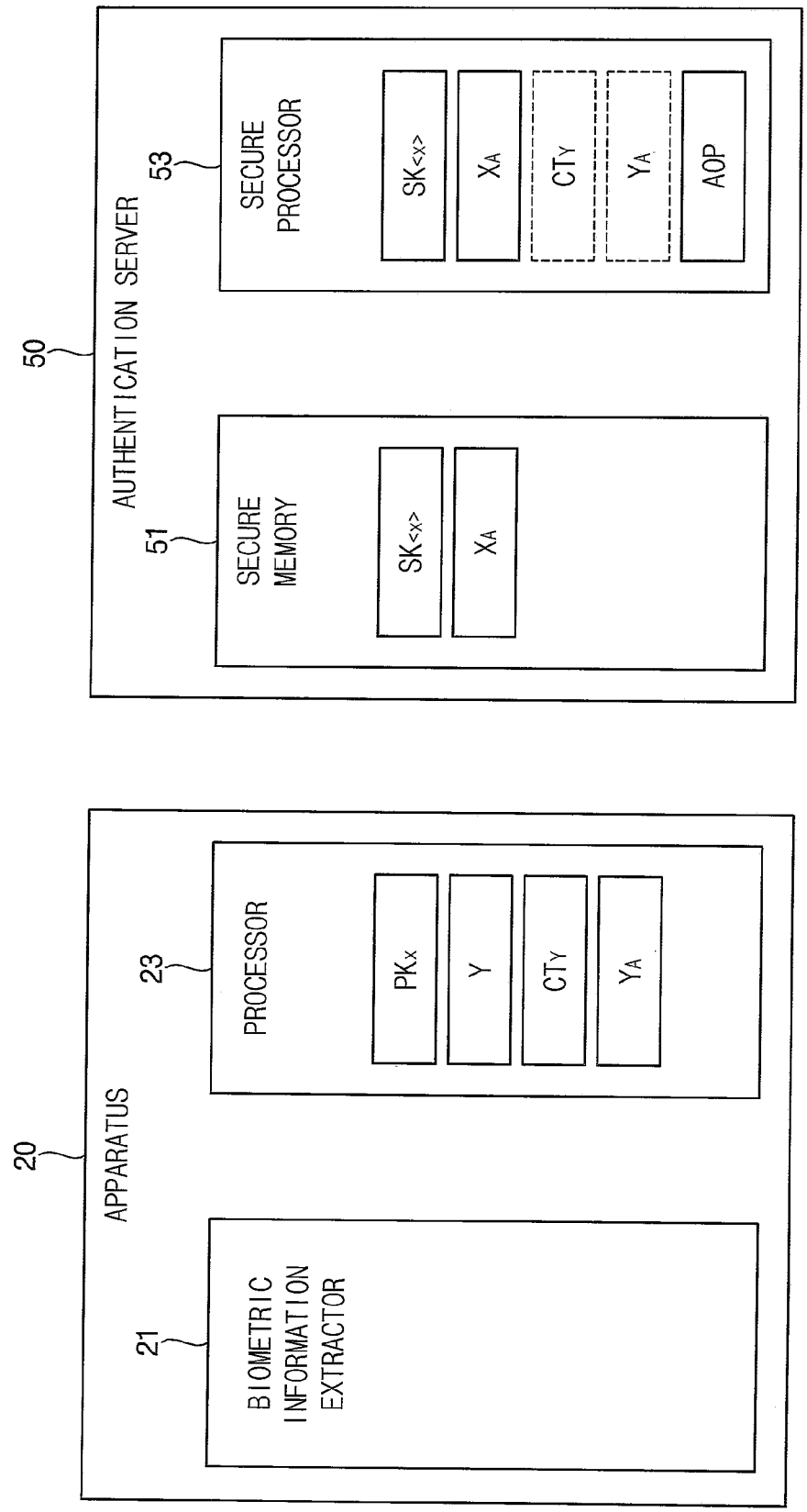
FIG. 18 is a block diagram further illustrating the method of FIG. 17.

FIG. 17 is a flowchart illustrating in still another example the method step of performing personal information authentication (S200 of FIG. 1), and FIG. 18 is a block diagram further illustrating the method of FIG. 17.

Comparing the method of FIG. 17 to the method of FIG. 12, the method step of performing personal information authentication process (S200) may further include deleting the ciphertext and second information (S245).

That is, after performing, at the authentication server 50, authentication for the authentication target personal information Y (S240), at the authentication server 50, the ciphertext $CT_Y$ and the second information $Y_A$ may be deleted (S245). Since the ciphertext $CT_Y$ and the second information $Y_A$ are no longer required following authentication (S240), the ciphertext $CT_Y$ and the second information $Y_A$ may be deleted at the authentication server 50.

In some embodiments, at the authentication server 50, the ciphertext $CT_Y$ and the second information $Y_A$ may be physically erased.

Figure 19:
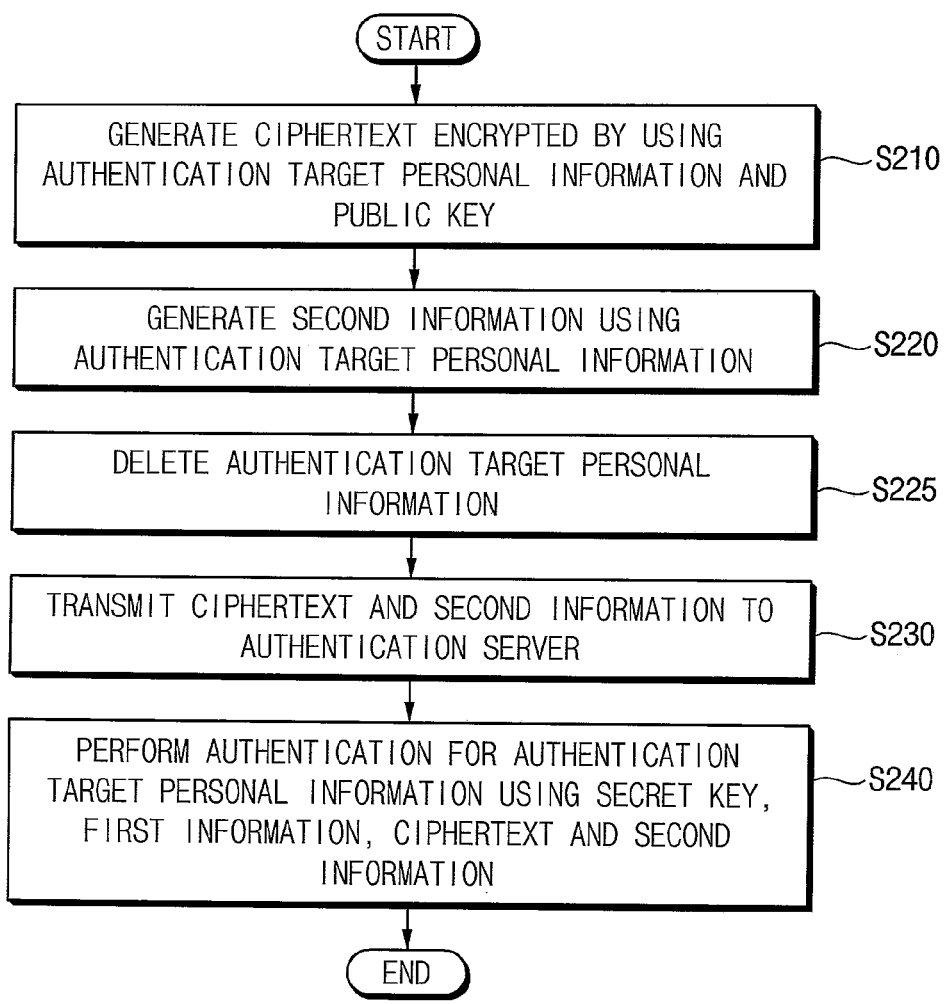
FIG. 19 is a flowchart illustrating in still another example the method step of performing personal information authentication in the method of FIG. 1.
Figure 20:
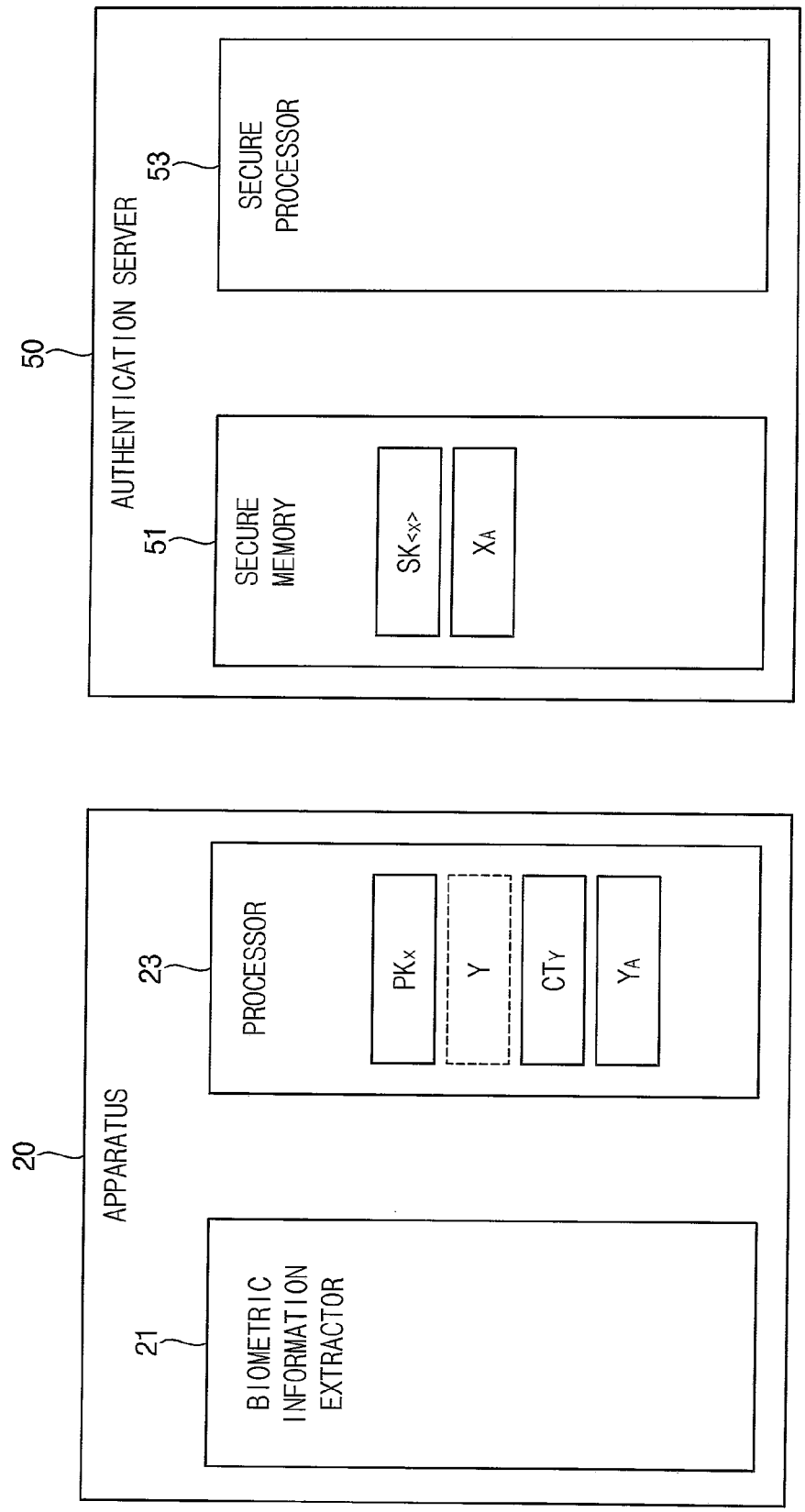
FIG. 20 is a block diagram further illustrating the method of FIG. 19.

FIG. 19 is a flowchart illustrating in still another example the method step of performing personal information authentication (S200 in FIG. 1), and FIG. 20 is a block diagram further illustrating the method of FIG. 19.

Comparing the method of FIG. 19 to the method of FIG. 12, the method step of performing personal information authentication process (S200) may further include deleting the authentication target personal information (S225).

That is, after generating, at the apparatus 20, the ciphertext $CT_Y$ and the second information $Y_A$ (S210 and S220), at the apparatus 20, the authentication target personal information Y may be deleted (S225). Since the authentication target personal information Y is not used in the authentication of step S240, the authentication target personal information Y that are unnecessary for the apparatus 20 may be deleted at the apparatus 20.

In some embodiments, at the apparatus 20, the authentication target personal information Y may be physically erased.

In some embodiments, one, two or three of S235 in FIG. 15, S245 in FIG. 17 and S225 in FIG. 19 may be performed.

Figure 21:
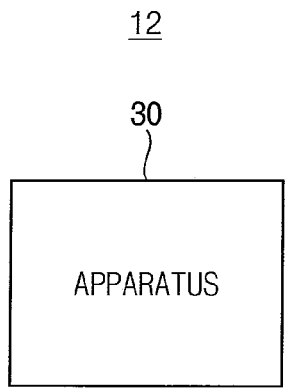
FIG. 21 is a general block diagram illustrating an authentication system according to embodiments of the inventive concept.

FIG. 21 is a general block diagram illustrating an authentication system 12 according to embodiments of the inventive concept.

Referring to FIG. 21, the authentication system 12 includes only the apparatus 30, as compared with the authentication system 10 of FIG. 2 which additionally included an authentication server 50.

Here, the apparatus 30 may be a personal device. The apparatus 30 may receive personal information (e.g., the enrollment target personal information) to be enrolled to perform the personal information enrollment process, and may store a key generated as a result of performing the personal information enrollment process. The apparatus 30 may receive personal information (e.g., the authentication target personal information) to be authenticated to generate information for performing the personal information authentication process, and may perform the personal information authentication process using the generated information and the stored key.

The apparatus 30 may be similar to the apparatus 20 in FIG. 2, and may be implemented similarly to that described in relation to FIGS. 3 and 4.

Figure 22:
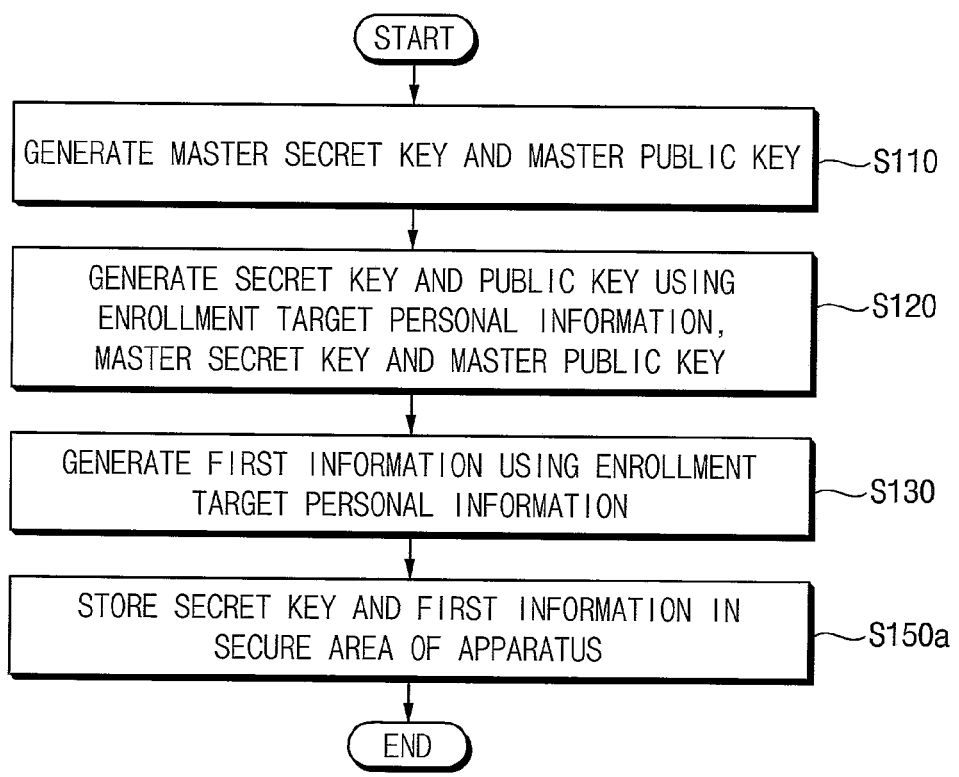
FIG. 22 is a flowchart illustrating in one example the method step of performing personal information enrollment in the method of FIG. 1.
Figure 23B:
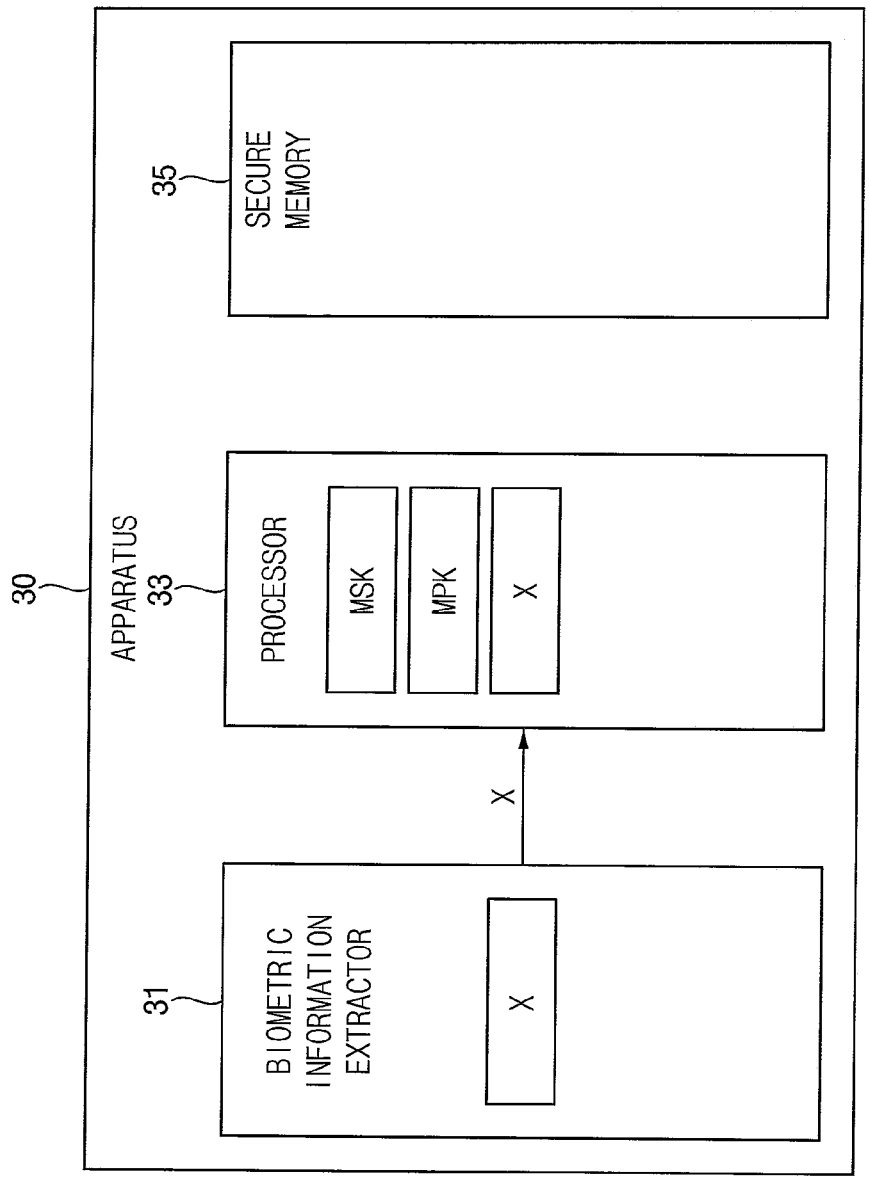
Figure 23D:
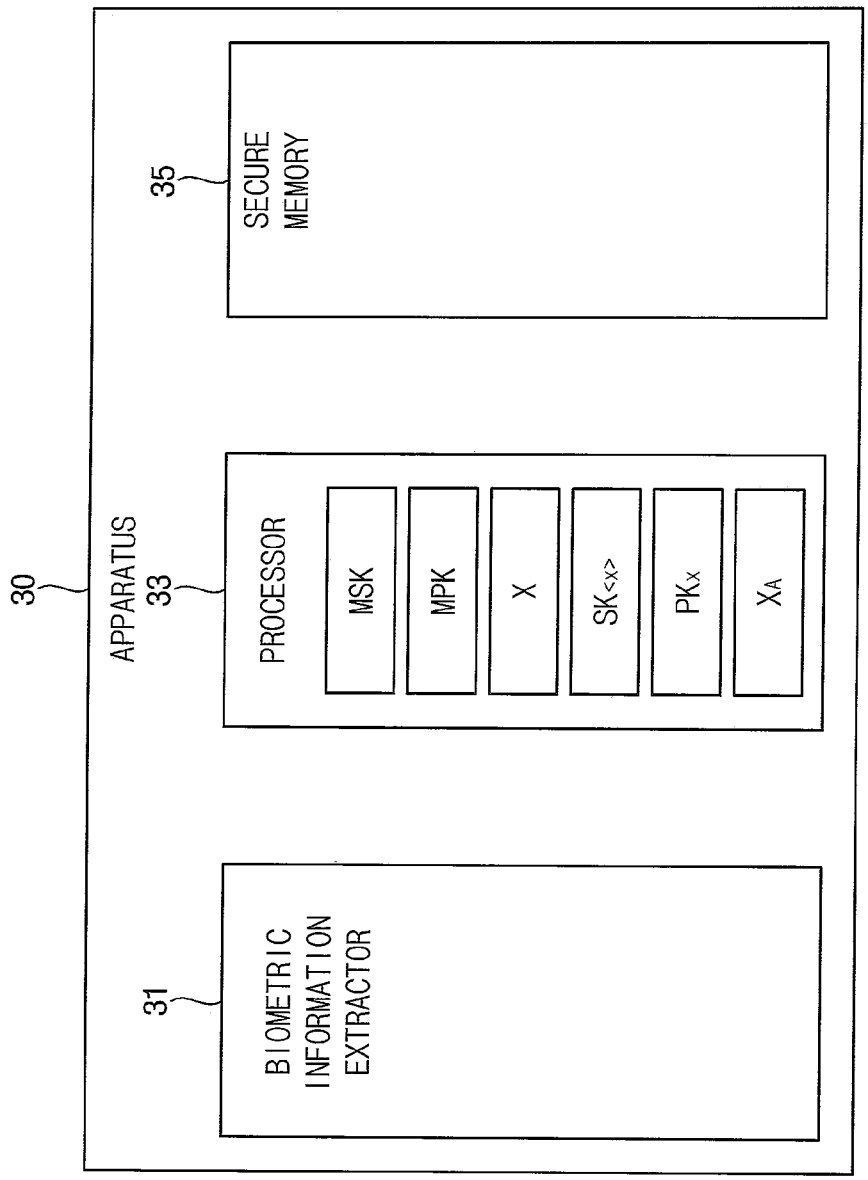

FIG. 22 is a flowchart illustrating in one example a method of performing personal information enrollment (S100 of FIG. 1), and FIGS. 23A, 23B, 23C, 23D and 23E are related block diagrams further illustrating the method of FIG. 22.

With respect to FIGS. 23A, 23B, 23C, 23D and 23E, the apparatus 30 may include a biometric information extractor 31, a processor 33 and a secure memory 35. In some embodiments, these components may respectively correspond to the biometric information extractor 121, the processor 113 and the memory 115 of FIG. 3. Here, the processor 33 may operate in a secure mode or a non-secure mode, and the secure memory 35 may correspond to a memory operating in the secure mode.

Referring to FIGS. 1, 22, 23A, 23B, 23C, 23D and 23E, when performing the personal information enrollment process (S100 in FIG. 1), at the apparatus 30, a master secret key MSK and a master public key MPK may be generated (e.g., the processor 33 included in the apparatus 30 may generate the master secret key MSK and the master public key MPK) (S110).

Next, at the apparatus 30, the enrollment target personal information X may be obtained from the biometric information extractor 31 (e.g., the processor 33 included in the apparatus 30 may obtain the enrollment target personal information X from the biometric information extractor 31). Thereafter, at the apparatus 30, a secret key $SK_{<x>}$ and a public key $PK_x$ may be generated using the enrollment target personal information X, the master secret key MSK and the master public key MPK (e.g., the processor 33 included in the apparatus 30 may generate the secret key $SK_{<x>}$ and the public key $PK_x$ using the enrollment target personal information X, the master secret key MSK and the master public key MPK) (S120).

Thereafter, at the apparatus 30, first information $X_A$ may be generated using the enrollment target personal information X (e.g., the processor 33 included in the apparatus 30 may generate the first information $X_A$ using the enrollment target personal information X) (S130).

Thereafter, the secret key $SK_{<x>}$ and the first information $X_A$ may be stored in a secure area (e.g., in the secure memory 35) of the apparatus 30 (S150a).

Here, S110, S120 and S130 may be respectively similar to S110, S120 and S130 of FIG. 6, and S150a may be similar to S150 of FIG. 6.

Figure 24:
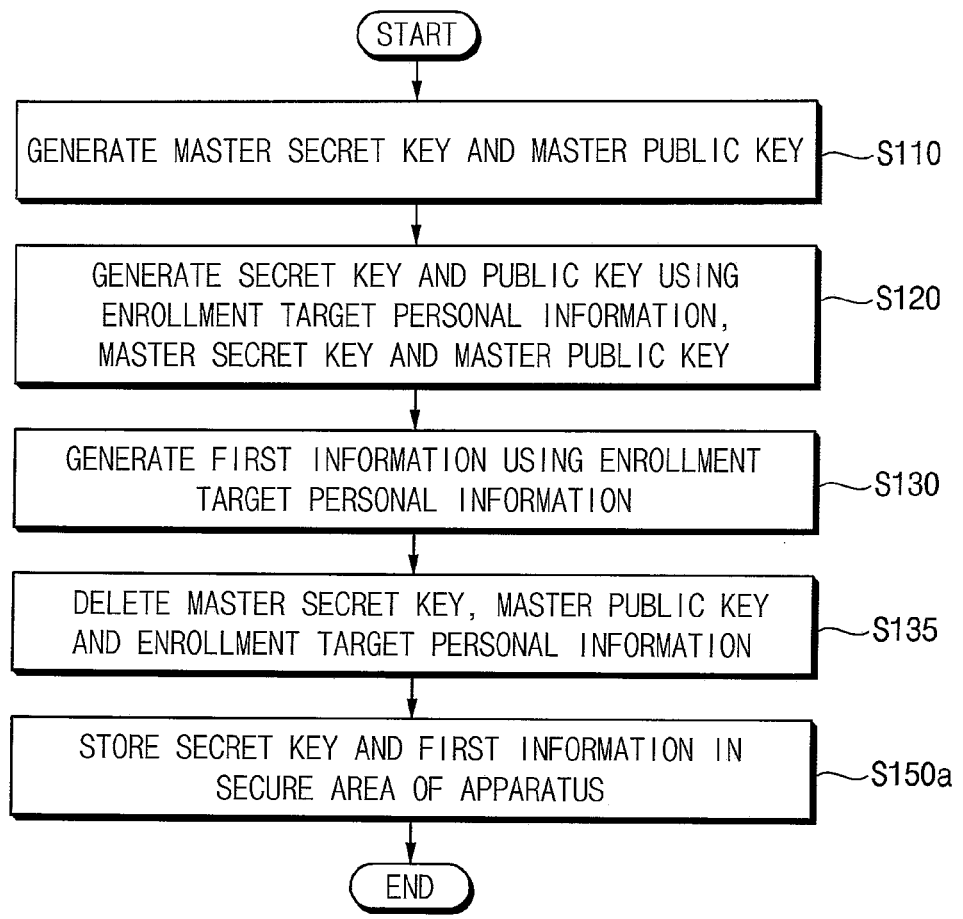
FIG. 24 is a flowchart illustrating another example of the method step of performing personal information enrollment in the method of FIG. 1.

FIG. 24 is a flowchart illustrating in another example the method step of performing personal information enrollment (S100 in FIG. 1). Referring to FIGS. 1 and 24, when performing personal information enrollment (S100), method steps S110, S120, S130 and S150a may be respectively similar to method steps S110, S120, S130 and S150a of FIG. 22.

After generating, at the apparatus 30, the secret key $SK_{<x>}$, the public key $PK_x$ and the first information $X_A$ (S120 and S130), at the apparatus 30, the master secret key MSK, the master public key MPK and the enrollment target personal information X may be deleted (step S135). Here, S135 of FIG. 24 may be substantially the same as S135 of FIG. 10.

Figure 25:
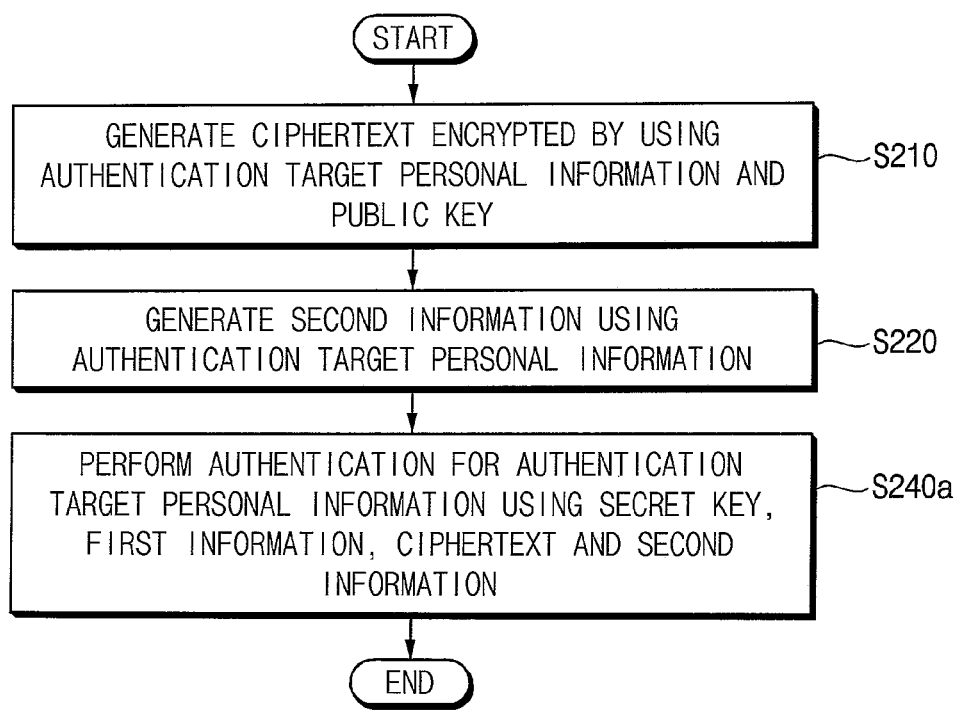
FIG. 25 is a flowchart illustrating in still another example of the method step of performing personal information authentication in the method of FIG. 1.
Figure 26B:
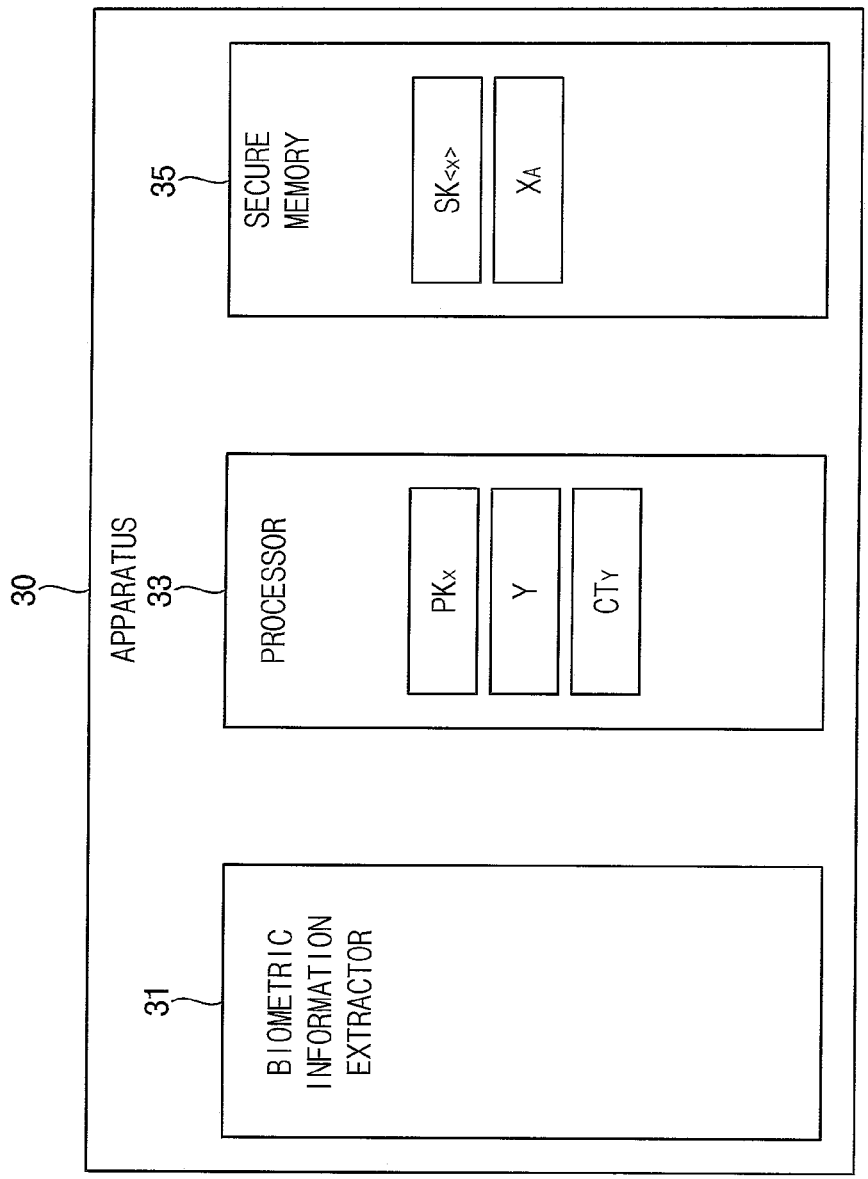
Figure 26C:
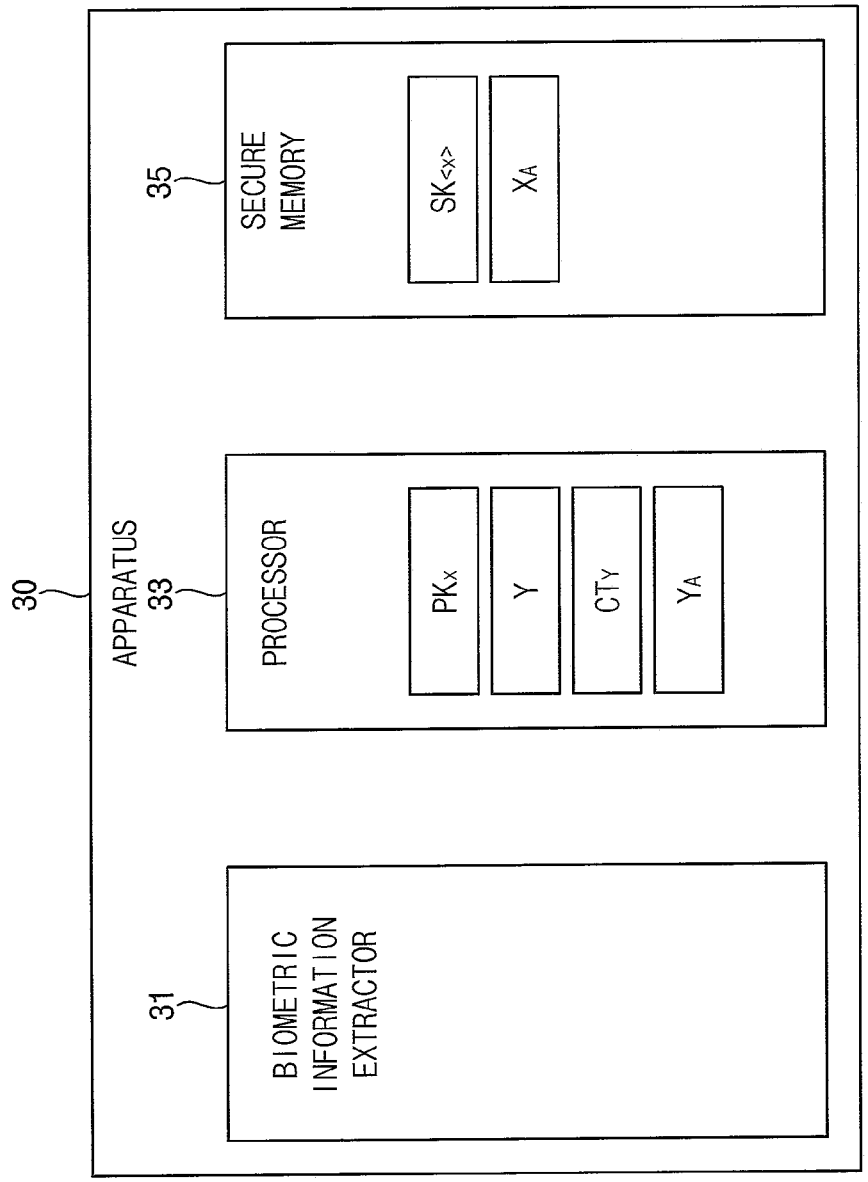
Figure 26D:
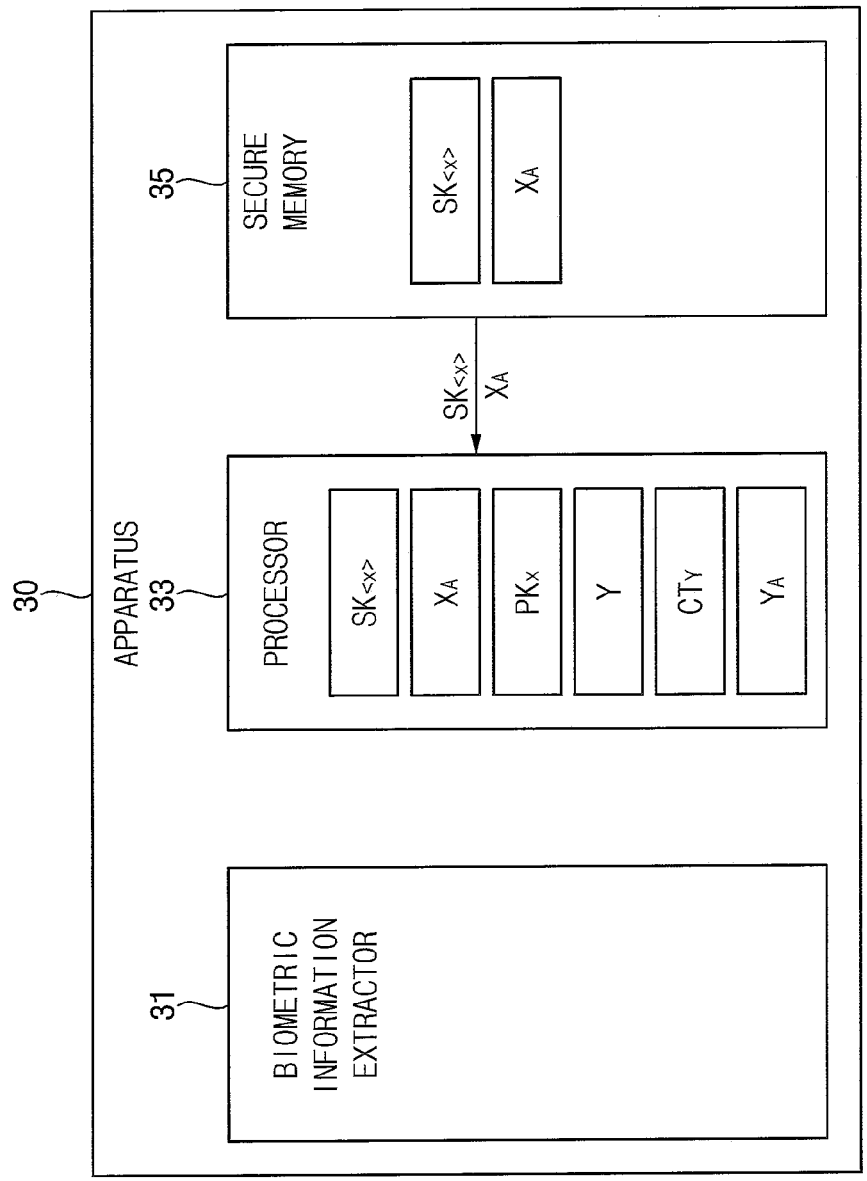

FIG. 25 is a flowchart illustrating in one example the method step of performing personal information authentication (S200 in FIG. 1), and FIGS. 26A, 26B, 26C, 26D and 26E are related block diagrams further illustrating the method of FIG. 25.

Referring to FIGS. 1, 25, 26A, 26B, 26C, 26D and 26E, when performing the personal information authentication process (S200), at the apparatus 30, the authentication target personal information Y may be obtained from the biometric information extractor 31 (e.g., the processor 33 included in the apparatus 30 may obtain the authentication target personal information Y from the biometric information extractor 31). In addition, at the apparatus 30, the public key $PK_x$ may be obtained (e.g., the processor 33 included in the apparatus 30 may obtain the public key $PK_x$ from the storage area of the apparatus 30).

Next, at the apparatus 30, a ciphertext $CT_Y$ encrypted using the authentication target personal information Y and the public key $PK_x$ may be generated (e.g., the processor 33 included in the apparatus 30 may generate the ciphertext $CT_Y$ encrypted using the authentication target personal information Y and the public key $PK_x$) (S210).

Thereafter, at the apparatus 30, second information $Y_A$ may be generated using the authentication target personal information Y (e.g., the processor 33 included in the apparatus 30 may generate the second information $Y_A$ using the authentication target personal information Y) (S220).

Thereafter, at the apparatus 30, the secret key $SK_{<x>}$ and the first information $X_A$ may be obtained (e.g., the processor 33 included in the apparatus 30 may obtain the secret key $SK_{<x>}$ and the first information $X_A$ from the secure area (e.g., the secure memory 35) of the apparatus 30). Thereafter, at the apparatus 30, an authentication AOP for the authentication target personal information Y may be performed using the secret key $SK_{<x>}$, the first information $X_A$, the ciphertext $CT_Y$ and the second information $Y_A$ (e.g., the processor 33 included in the apparatus 30 may perform the authentication AOP for the authentication target personal information Y using the secret key $SK_{<x>}$, the first information $X_A$, the ciphertext $CT_Y$ and the second information $Y_A$) (S240a).

Method steps S210 and S220 may be respectively similar to method steps S210 and S220 of FIG. 12, and method step S240a may be similar to step S240 of FIG. 12.

Figure 27:
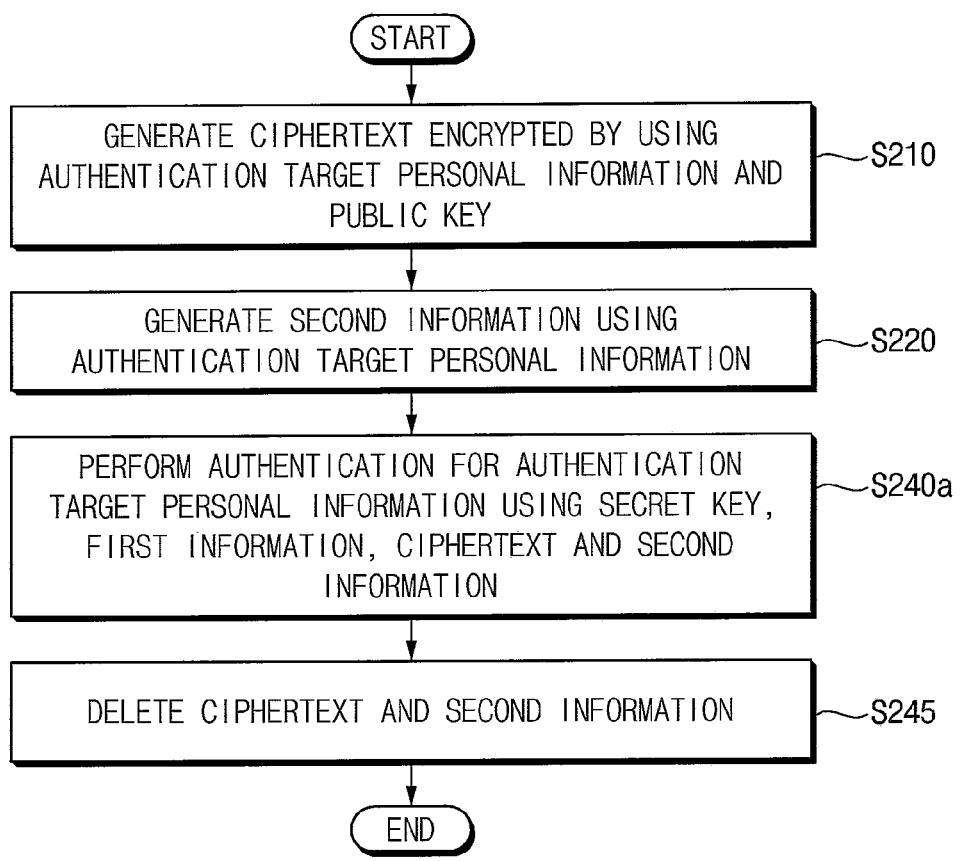
FIG. 27 is a flowchart illustrating in still another example the method step of performing personal information authentication in the method of FIG. 1.

FIG. 27 is a flowchart illustrating in still another example the method step of performing personal information authentication (S200 in FIG. 1).

Referring to FIGS. 1 and 27, when performing the personal information authentication process (S200), method steps S210, S220 and S240a may be respectively similar to method steps S210, S220 and S240a of FIG. 25.

After performing, at the apparatus 30, the authentication for the authentication target personal information Y (S240a), at the apparatus 30, the ciphertext $CT_Y$ and the second information $Y_A$ may be deleted (S245). Here, method step S245 may be substantially the same as method step S245 of n FIG. 17.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

The inventive concept may be applied to various electronic devices and systems in which the personal authentication is required. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications fall within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An authentication method using a functional encryption in an authentication system including an apparatus and an authentication server, the authentication method comprising:

generating, at the apparatus, a master secret key and a master public key;

generating, at the apparatus, a secret key and a public key using enrollment target personal information, the master secret key and the master public key, wherein the public key is different from the master public key;

generating, at the apparatus, first information using the enrollment target personal information;

communicating the secret key and the first information from the apparatus to the authentication server;

storing the secret key and the first information in a secure area of the authentication server;

generating, at the apparatus, a ciphertext comprising authentication target personal information encrypted with the public key;

generating, at the apparatus, second information using the authentication target personal information;

communicating the ciphertext and the second information from the apparatus to the authentication server; and performing, at the authentication server, an authentication of the authentication target personal information using a function of the first information, the ciphertext decrypted using the secret key, and the second information, wherein the performing of the authentication of the authentication target personal information includes determining whether an Euclidean distance of the enrollment target personal information and the authentication target personal information satisfies a threshold condition.

2. The authentication method of claim 1, comprising performing the authentication of the authentication target personal information such that use of the enrollment target personal information and the authentication target personal information is limited to encrypted form.

3. The authentication method of claim 1, wherein determining whether the Euclidean distance of the enrollment target personal information and the authentication target personal information satisfies the threshold condition comprises determining whether a value of the function is included in a set.

4. The authentication method of claim 1, further comprising:

deleting, at the apparatus, the master secret key, the master public key and the enrollment target personal information after generating the secret key, the public key and the first information at the apparatus.

5. The authentication method of claim 1, further comprising:

deleting, at the apparatus, the authentication target personal information after generating the ciphertext and the second information at the apparatus.

6. The authentication method of claim 1, wherein the enrollment target personal information and the authentication target personal information are biometric information.

7. The authentication method of claim 1, wherein the first information and the second information are generated by calculating an inner product.

8. The authentication method of claim 1, wherein the apparatus comprises a mobile phone, a laptop computer, or an automotive component.

9. The authentication method of claim 1, further comprising:

deleting, at the apparatus, the secret key and the first information after communicating the secret key and the first information from the apparatus to the authentication server.

10. The authentication method of claim 9, wherein the deleting of the secret key and the first information includes physically erasing memory storing the secret key and the first information.

11. The authentication method of claim 1, further comprising:
deleting, at the apparatus, the ciphertext and the second information after communicating the ciphertext and the second information from the apparatus to the authentication server.

12. The authentication method of claim 11, wherein the deleting of the ciphertext and the second information includes physically erasing memory storing the ciphertext and the second information.

13. The authentication method of claim 1, further comprising:
deleting, at the authentication server, the ciphertext and the second information after performing the authentication of the authentication target personal information at the authentication server.

14. The authentication method of claim 13, wherein the deleting of the ciphertext and the second information includes physically erasing memory storing the ciphertext and the second information.

15. An authentication method using a functional encryption in an apparatus, the authentication method comprising:
generating a master secret key and a master public key;
generating a secret key and a public key using enrollment target personal information, the master secret key and the master public key, wherein the public key is different from the master public key;
generating first information using the enrollment target personal information;
storing the secret key and the first information in a secure area;
generating a ciphertext comprising authentication target personal information encrypted with the public key;
generating second information using the authentication target personal information; and
performing authentication of the authentication target personal information using a function of the first information, the ciphertext decrypted using the secret key, and the second information,
wherein the performing of the authentication includes:
determining whether an Euclidean distance of the enrollment target personal information and the authentication target personal information satisfies a threshold condition.

16. The authentication method of claim 15, comprising performing the authentication of the authentication target personal information such that use of the enrollment target personal information and the authentication target personal information is limited to encrypted form.

17. The authentication method of claim 15, further comprising:
deleting the enrollment target personal information, the master secret key and the master public key after generating the secret key and the public key.

18. The authentication method of claim 15, further comprising:
deleting the ciphertext and the second information after performing the authentication.

19. The authentication method of claim 18, wherein deleting of the ciphertext and the second information includes physically erasing memory storing the ciphertext and the second information.

20. An authentication system comprising:
an apparatus; and
an authentication server including a secure area, configured to communicate with the apparatus, and further configured to perform authentication using a functional encryption,
wherein the apparatus is configured to:
generate a master secret key and a master public key,
generate a secret key and a public key using enrollment target personal information, the master secret key and the master public key, wherein the public key is different from the master public key,
generate first information using the enrollment target personal information,
communicate the secret key and the first information to the authentication server,
generate a ciphertext comprising authentication target personal information encrypted with the public key,
generate second information using the authentication target personal information, and
communicate the ciphertext and the second information to the authentication server;
wherein the authentication server is further configured to:
store the secret key and the first information in the secure area, and
perform an authentication of the authentication target personal information using a function of the first information, the ciphertext decrypted using the secret key, and the second information,
wherein the performing of the authentication of the authentication target personal information includes determining whether an Euclidean distance of the enrollment target personal information satisfies a threshold condition; wherein the apparatus is further configured to:
physically erase memory storing the secret key and the first information after communicating the secret key and the first information to the authentication server, and
physically erase memory storing the ciphertext and the second information after communicating the ciphertext and the second information to the authentication server; and
wherein the authentication server is configured to physically erase memory storing the ciphertext and the second information after performing the authentication of the authentication target personal information.

* * * * *